United States Patent
Wang

(10) Patent No.: US 10,051,264 B2
(45) Date of Patent: Aug. 14, 2018

(54) MARKING REFERENCE PICTURES IN VIDEO SEQUENCES HAVING BROKEN LINK PICTURES

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 282 days.

(21) Appl. No.: 13/796,828

(22) Filed: Mar. 12, 2013

(65) Prior Publication Data

US 2013/0279575 A1    Oct. 24, 2013

Related U.S. Application Data

(60) Provisional application No. 61/636,566, filed on Apr. 20, 2012, provisional application No. 61/643,100, filed on May 4, 2012, provisional application No. 61/667,371, filed on Jul. 2, 2012.

(51) Int. Cl.
| | |
|---|---|
| H04N 7/26 | (2006.01) |
| H04N 19/136 | (2014.01) |
| H04N 19/70 | (2014.01) |
| H04N 19/46 | (2014.01) |
| H04N 19/174 | (2014.01) |

(52) U.S. Cl.
CPC ....... H04N 19/00139 (2013.01); H04N 19/70 (2014.11); H04N 19/174 (2014.11); H04N 19/46 (2014.11)

(58) Field of Classification Search
CPC ....... H04N 19/00951; H04N 19/00139; H04N 19/70; H04N 19/174; H04N 19/46

USPC .................................................. 375/240.27
See application file for complete search history.

(56) References Cited

U.S. PATENT DOCUMENTS

| | | | |
|---|---|---|---|
| 5,515,107 A | 5/1996 | Chiang et al. | |
| 5,543,847 A * | 8/1996 | Kato ............ | H04N 9/8042 |
| | | | 375/240.15 |
| 6,529,550 B2 | 3/2003 | Tahara et al. | |
| 6,674,477 B1 | 1/2004 | Yamaguchi et al. | |

(Continued)

FOREIGN PATENT DOCUMENTS

| | | |
|---|---|---|
| CN | 1148955 C | 5/2004 |
| CN | 1739299 A | 2/2006 |

(Continued)

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union, Oct. 2014, 540 pp.

(Continued)

*Primary Examiner* — Andy Rao
*Assistant Examiner* — Zaihan Jiang
(74) *Attorney, Agent, or Firm* — Shumaker & Sieffert, P.A.

(57) ABSTRACT

Systems, methods, and devices for processing video data are disclosed. Some examples determine that a current picture is a broken-link access (BLA) picture. These examples may also mark a reference picture in a picture storage buffer as unused for reference. In some examples, this may be done prior to decoding the BLA picture.

18 Claims, 10 Drawing Sheets

(56) References Cited

U.S. PATENT DOCUMENTS

| | | | |
|---|---|---|---|
| 7,236,526 B1* | 6/2007 | Kitamura | H04N 7/50 375/240.16 |
| 7,346,216 B2* | 3/2008 | Adachi | H04N 19/46 375/E7.129 |
| 7,706,667 B2 | 4/2010 | Mae et al. | |
| 7,724,818 B2 | 5/2010 | Hannuksela et al. | |
| 7,782,943 B2 | 8/2010 | Jeon et al. | |
| 8,050,321 B2 | 11/2011 | Hannuksela | |
| 8,107,539 B2 | 1/2012 | Hannuksela et al. | |
| 8,204,134 B2 | 6/2012 | Hannuksela | |
| 8,254,447 B2 | 8/2012 | Toma et al. | |
| 8,532,055 B2 | 9/2013 | Chaudry et al. | |
| 8,559,510 B2 | 10/2013 | Hosokawa | |
| 8,693,539 B2 | 4/2014 | Lim et al. | |
| 8,958,486 B2 | 2/2015 | Rodriguez et al. | |
| 2002/0080875 A1* | 6/2002 | Tahara | H04N 21/23406 375/240.02 |
| 2004/0073949 A1* | 4/2004 | Chen | H04N 7/17309 725/135 |
| 2005/0123274 A1 | 6/2005 | Crinon et al. | |
| 2005/0152448 A1* | 7/2005 | Crinon | H04N 21/23424 375/240.01 |
| 2006/0153463 A1 | 7/2006 | Notoya et al. | |
| 2007/0030894 A1 | 2/2007 | Tian et al. | |
| 2007/0110390 A1 | 5/2007 | Toma et al. | |
| 2007/0223582 A1 | 9/2007 | Borer | |
| 2008/0046614 A1* | 2/2008 | Aridome | G11B 27/036 710/65 |
| 2008/0063050 A1 | 3/2008 | Kadono | |
| 2008/0137742 A1 | 6/2008 | Chen et al. | |
| 2008/0232467 A1 | 9/2008 | Iguchi et al. | |
| 2009/0148057 A1 | 6/2009 | Chen et al. | |
| 2009/0238280 A1 | 9/2009 | Bandyopadhyay et al. | |
| 2009/0279608 A1 | 11/2009 | Jeon et al. | |
| 2010/0008420 A1* | 1/2010 | Lin | G11B 27/034 375/240.15 |
| 2010/0098156 A1 | 4/2010 | Karczewicz et al. | |
| 2010/0220788 A1 | 9/2010 | Wittmann et al. | |
| 2010/0254456 A1 | 10/2010 | Matsushita et al. | |
| 2011/0090921 A1 | 4/2011 | Anthru et al. | |
| 2011/0222837 A1 | 9/2011 | Walton et al. | |
| 2011/0255796 A1 | 10/2011 | Nakamura et al. | |
| 2012/0230433 A1 | 9/2012 | Chen et al. | |
| 2012/0307911 A1 | 12/2012 | Dachiku | |
| 2013/0003868 A1 | 1/2013 | Sjoberg et al. | |
| 2013/0022104 A1 | 1/2013 | Chen et al. | |
| 2013/0058408 A1 | 3/2013 | Wahadaniah et al. | |
| 2013/0070841 A1 | 3/2013 | Wahadaniah et al. | |
| 2013/0222538 A1 | 8/2013 | Chen et al. | |
| 2013/0235152 A1* | 9/2013 | Hannuksela | H04N 19/00769 348/43 |
| 2013/0272430 A1 | 10/2013 | Sullivan et al. | |
| 2013/0272618 A1 | 10/2013 | Deshpande et al. | |
| 2013/0272619 A1 | 10/2013 | Deshpande | |
| 2013/0279564 A1 | 10/2013 | Wang | |
| 2013/0279599 A1 | 10/2013 | Wang | |
| 2014/0003506 A1 | 1/2014 | Wang et al. | |
| 2014/0126640 A1 | 5/2014 | Samuelsson et al. | |
| 2014/0301477 A1* | 10/2014 | Deshpande | H04N 19/82 375/240.25 |
| 2017/0142445 A1 | 5/2017 | Sullivan et al. | |

FOREIGN PATENT DOCUMENTS

| | | |
|---|---|---|
| CN | 1943246 A | 4/2007 |
| CN | 101502096 A | 8/2009 |
| CN | 101548550 A | 9/2009 |
| CN | 101765017 A | 6/2010 |
| CN | 101778235 A | 7/2010 |
| CN | 101822061 A | 9/2010 |
| EP | 0971543 A1 | 1/2000 |
| EP | 1450564 A2 | 8/2004 |
| EP | 1496707 A1 | 1/2005 |
| EP | 2424247 A2 | 2/2012 |
| JP | H111177921 A | 7/1999 |
| JP | 2001069515 A | 3/2001 |
| JP | 2007214814 A | 8/2007 |
| JP | 2010041354 A | 2/2010 |
| JP | 2015527756 A | 9/2015 |
| RU | 2402886 C2 | 10/2010 |
| RU | 2010111711 A | 10/2011 |
| WO | 2007114608 A1 | 10/2007 |
| WO | 2008084443 A1 | 7/2008 |
| WO | 2013002700 A1 | 1/2013 |
| WO | 2013006114 A2 | 1/2013 |
| WO | 2013030456 A1 | 3/2013 |
| WO | 2013030458 A1 | 3/2013 |
| WO | 2013062391 A1 | 5/2013 |
| WO | 2013153830 A1 | 10/2013 |
| WO | 2013158670 A1 | 10/2013 |
| WO | 2013184305 A1 | 12/2013 |
| WO | 2014004391 A1 | 1/2014 |
| WO | 2014006854 A1 | 1/2014 |

OTHER PUBLICATIONS

Office Action from U.S. Appl. No. 13/796,737 dated Apr. 16, 2015 (19 pages).

Bross, B., et al., High Efficiency Video Coding (HEVC) text specification draft 10 (for FDIS & Last Call), Joint Collaborative Team on Video Coding (JCT-VC) of ITU-T SG16 WP3 and ISO/IEC JTC1/SC29/WG11, 12th Meeting: Geneva, CH, Jan. 14-23, 2013, Document JCTVC-L1003_v34, 310 pp.

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d2, 290 pp.

Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.

Bross, et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Oct. 10-19, 2012, JCTVC-K1003_v7, pp. 290.

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.

Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

Chen et al., "AHG15: Conforming bitstreams starting with CRA pictures", JCT-VC Meeting; MPEG Meeting; Nov. 21-30, 2011; Geneva, (Joint Collaborative Team on Video Coding of ISO/IEC JTC1/SC29/WG11 and ITU-T SG. 16); URL: http://wftp3.itu.int/av-arch/jctvc-site/, No. JCTV-G319, XP0301103031, 6 pp.

Deshpande, et al., "AHG11: On Leading Pictures", JCT-VC Meeting; MPEG Meeting; Apr. 27-May 7, 2012; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-10275, XP030112038, 3 pp.

Deshpande et al., "AHG21: Comments on Signaling of reference picture," JCT-VC Meeting; MPEG Meeting; Feb. 1-10, 2012, San Jose; (Joint Collaborative Team on Video Coding of ISO/IEC JTCI/SC29/WG11 and ITU-T SG.16); URL: http://wftp3.itu.int/av-arch/jctvc-site/ No. JCTVC-I-10531, XP030111558, 5 pp.

Deshpande, "On Random Access Point Picture Signaling", JCT-VC Meeting; MPEG Meeting; Oct. 10-19, 2012; Shanghai; (Joint Collaborative Team on Video Coding of ISO/IEC JTC1/SC29/

(56) References Cited

OTHER PUBLICATIONS

WG11 and ITU-T SG.16 ); URL: http://wftp3.itu.int/av-arch/jctvc-site/, No. JCTVC-K0219, XP030113101, 8 pp.
Fujibayashi et al: "Random access support for HEVC", JCT-VC Meeting; MPEG Meeting; Jan. 20-28, 2011; Daegu;(Joint Collaborative Team on Video Coding of ISO/IEC JTC1/SC29/WG11and ITU-T SG.16 ); URL: http://wftp3.itu.int/av-arch/jc tvc-site/, No. JCTVC-D234, XP030008274, ISSN: 0000-0013, 8 pp.
Hendry, et al., "AHG 9: On random access point NAL units", JCT-VC Meeting; MPEG Meeting; Oct. 10-19, 2012; Shanghai; (Joint Collaborative Team on Video Coding of ISO/IEC JTC1/SC29/WG11 and ITU-T SG.16 ); URL: http://wftp3.itu.int/av-arch/jctvc-site/, No. JCTVC-K0166, XP030113048, 8 pp.
Hendry, et al., "Random Access Detection and Notification", 98. MPEG Meeting; Nov. 21-30, 2011; Geneva; (Motion Picture Expert Group or ISO/IEC JTC1/SC29/WG11), No. m21712, XP030050275, 6 pp.
International Search Report and Written Opinion—PCT/US2013/036225, ISA/EPO, Jul. 23, 2013, 15 pp.
ITU-T H.264, Series H: Audiovisual and Multimedia Systems, Infrastructure of audiovisual services—Coding of moving video, Advanced video coding for generic audiovisual services, Mar. 2010, 674 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Ramasubramonian, et al., AHG13: Signalling of long-term reference pictures in the slice header, JCT-VC Meeting; MPEG Meeting; Jul. 11-20, 2012; Stockholm; (Joint Collaborative Team on Video Coding of ISO/IEC JTC1/SC29/WG11 and ITU-T SG.16 ); URL:http://wftp3.itu.int/av-arch/jctvc-site/,, No. JCTVC-J0115, XP030112477, 11 pp.
Ramasubramonian et al., "AHG15: Signalling of long-term reference pictures in the SPS," JCT-VC Meeting; MPEG Meeting; Apr. 27- May 7, 2012; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-I0340, XP030112103, the whole document, 6 pp.
Sjoberg, et al., "Overview of HEVC high-level syntax and reference picture management" IEEE Transactions on Circuits and Systems for Video Technology, Jan. 1, 2012, XP055045360, ISSN: 1051-8215, DOI: 10.11 09/TCSVT.2012.2223052, 14 pp.
Sullivan, "CRA pictures with broken links", JCT-VC Meeting; MPEG Meeting; Apr. 27-May 7, 2012; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-10404, XP030112167, 2 pp.
Sullivan, "CRA pictures with broken links (rev. 1)", MPEG Meeting; Apr. 27-May 7, 2012; Geneva; (Motion Picture Expert Group or ISO/IEC JTC1/SC29/WG11), No. m24653, May 7, 2012 (May 7, 2012), XP030052996, 3 pp.
Wang, et al., "AHG15: On reference picture set derivation and LTRP signaling in Slice header," JCT-VC Meeting; 100. MPEG Meeting; Apr. 27-May 7, 2012; Geneva; (Joint Collaborative Team on Video Coding of ISO/IEC JTCI/ SC29/WG11 and ITU-T SG.16); URL:http://wftp3.itu.int/av-arch/ jctvc-site/, No. JCTVC-10342, XP030112105, 6 pp.
Wang et al., "AHG9: Splicing-friendly coding of some parameters", JCT-VC Meeting; MPEG Meeting; Jul. 11-20, 2012; Stockholm; (Joint Collaborative Team on Video Coding of ISO/IEC JTC1/SC29/WG11 and ITU-T SG.16 ); URL: http://wftp3.itu.int/av-arch/jctvc-site/, No. JCTVC-J0108, XP030112470, the whole document, 5 pp.
Wang, et al., "On parameter sets," Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, Document: JCTVC-I0338, 6 pp.

Wiegand et al., "WD2: Working Draft 2 of High-Efficiency Video Coding," JCTVC-D503, 4th Meeting: Daegu, KR, Jan. 20-28, 2011, 153 pp.
Wiegand, T., et al., "WD3: Working Draft 3 of High-Efficiency Video Coding," Document JCTVC-E603, 5th Meeting: Geneva, CH, Mar. 16-23, 2011, pp. 193.
Wiegand et al., "WD1: Working Draft 1 of High-Efficiency Video Coding", JCTVC-C403, 3rd Meeting: Guangzhou, CN, Oct. 7-15, 2010, 137 pp.
Deshpande, et al., "HRD Buffering Bitstreams Starting with CRA Picture," 9th Meeting, Geneva, Switzerland, Apr. 27-May 7, 2012, Document: JCTVC-10277, 7 pp.
Boyce, et al., "Extensible High Layer Syntax for Scalability ", MPEG Meeting; Mar. 21, 2011-Mar. 25, 2011; Geneva; (Motion Picture Expert Group or ISO/IEC JTC1/SC29/WG11), No. m19806, Mar. 22, 2011 (Mar. 22, 2011), XP030048373, 10 pp.
Fujibayashi, et al., "Random access support for HEVC", MPEG Meeting;Jan. 24, 2011-Jan. 28, 2011; Daegu; (Motion Picture Expert Group or ISO/IEC JTC1/SC29/WG11), No. m18994, XP030047563, 8 pp.
Suehring, "AHG11: High level syntax parsing issues", JCT-VC Meeting; MPEG Meeting; Apr. 4, 2012-Jul. 5, 2012; Geneva; (Joint Collaborative Team on Video Coding of ISO/IEC JTC1/SC29/WG11 and ITU-T Sg.16 ); URL: http:// wftp3.itu.int/av-arch/jctvc-site/, No. JCTVC-10113, XP030111876, 6 pp.
Wang, et al., "AHG21: On DPB management", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-G314, XP030110298, 7 pp.
Itu-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
Second Written Opinion from International Application No. PCT/US2013/036225, dated May 6, 2014, 9 pp.
International Preliminary Report on Patentability from International Application No. PCT/US2013/036225, dated Jul. 30, 2014, 10 pp.
Final Office Action from U.S. Appl. No. 13/796,737 dated Oct. 21, 2015 (27 pages).
Office Action from U.S. Appl. No. 13/797,458 dated Sep. 4, 2015 (18 pages).
Final Office Action from U.S. Appl. No. 13/796,737, dated Oct. 21, 2015, 27 pp.
Hendry, et al., "AHG15: Signalling Long-Term Reference Picture Set", Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, JCTVC-I0076r1, 8 pp.
Park, et al., "AHG21: Combined signaling for reference picture set," Joint Collaborative Team on Video Coding (JCT-VC) of ITU-T SG16 WP3 and ISO/IEC JTC1/SC29/WG11, 7th Meeting: Geneva, CH, Nov. 21-30, 2011, JCTVC-G526-r3, Nov. 21m, 2011, 4 pp.
Samuelsson, et al., "Temporal Layer Access Pictures", Feb. 1-10, 2012; Joint Collaborative Team on Video Coding (JCT-VC) of ITU-T SG16 WP3 and ISO/IEC JTC1/SC29/WG11 JCTVC-H0566, ITU-T, Feb. 10, 2012, 5 pp.
Wahadaniah, "AHG21: Flexible Signalling of Long Term Reference Pictures", Feb. 1-10, 2012; Joint Collaborative Team on Video Coding (JCT-VC) of ITU-T SG16 WP3 and ISO/IEC JTC1/SC29/WG11, 8th Meeting: San Jose, CA, USA, Jan. 2012, JCTVC-H0468_rl, 9 pp.
Deshpande S, et al., "AHG11: Signaling of CRA Pictures", JCT-VC Meeting; 100. MPEG Meeting; Apr. 27, 2012-Jul. 5, 2012; Geneva; (Joint Collaborative Team on Video Coding of ISO/IEC JTC1/SC29/WG11 and ITU-T SG.16 (WP3); URL: http://wftp3.itu.int/av-arch/jctvc-site/, No. JCTVC-10278, Apr. 17, 2012 (Apr. 17, 2012), XP030112041, 4 pp.
Hendry, et al., "Random Access Detection and Notification", Joint Collaborative Team on Video Coding (JCT-VC) of ITU-T SG16 WP3 and ISO/IEC JTC1/SC29/WG11, 7th Meeting: Geneva, CH, Nov. 17, 2011, JCTVC-G159_r1 , pp. 1-6.
Kanumuri S., et al., "Refinement of random access point support", 10. JCT-VC Meeting; 101. MPEG Meeting; Nov. 7, 2012-Jul. 20,

(56) References Cited

OTHER PUBLICATIONS

2012; Stockholm; (Joint Collaborative Team on Video Coding of ISO/IEC JTC1/SC29/WG11 and ITU-T SG.16 WP3); URL: http://wftp3.1tu .i nt/ a v -arch/jctvc-site/ No. JCTVC-J0344, Jul. 3, 2012 (Jul. 3, 2012), XP030112706.

Wang Y.K., et al., "AHG9: On RAP pictures", 10. JCT-VC Meeting; 101. MPEG Meeting; Nov. 7, 2012-Jul. 20, 2012; Stockholm; (Joint Collaborative Team on Video Coding of ISO/IEC JTC1/SC29/WG11 and ITU-T SG.16 WP3); URL: http://wftp3.itu.int/av-arch/jctvc-site/, No. JCTVC-J0107, Jul. 3, 2012 (Jul. 3, 2012), XP030112469, pp. 1-7.

Wang Y-K., et al., "On Bitstreams Starting With CRA Pictures", Joint Collaborative Team on Video Coding (JCT-VC) of ITU-T SG16 WP3 and ISO/IEC JTC1/SC29/WG11, 8th Meeting: San Jose, CA, USA, Feb. 2012, JCTVC-H0496r2, pp. 1-6.

Wang Y.K., et al., "On bitstreams starting with CRA pictures," 8. JCT-VC Meeting, 99. MPEG Meeting; Jun. 2, 2012-Oct. 2, 2012; San Jose CA; (Motion Picture Expert Group or ISO/IEC JTC1/SC29/WG11), No. m23377, Feb. 10, 2012 (Feb. 10, 2012), XP030051902, pp. 1-6.

Co-pending U.S. Appl. No. 61/624,984, filed Apr. 16, 2012.

Bross B., "High Efficiency Video Coding (HEVC) Text Specification Draft 6", Joint Collaborative Team on Video Coding (JCT-VC) of ITU-T SG16 WP3 and ISO/IEC JTC1/SC29/WG11 8th Meeting, JCTVC-HI003_d6, Feb. 2012, pp. 34-36, 74-77, 91, and 92.

Hannuksela M.M., "AHG21: On Reference Picture List Construction and Reference Picture Marking", Joint Collaborative Team on Video Coding (JCT-VC) of ITU-T SG16 WP3 and ISO/IEC JTC1/SC29/WG11 7th Meeting, Dec. 2011, JCTVC-G643r1, pp. 1-3.

Bross B., et al., "WD6: High Efficiency Video Coding (HEVC) text specification draft 6 (version JCTVC-H1003_dA)", Joint Collaborative Team on Video Coding (JCT-VC) of ITU-T SG16 WP3 and ISO/IEC JTC1/SC29/WG11 7th Meeting: Geneva, CH, Nov. 21-30, 2011, Feb. 13, 2012 (Feb. 13, 2012), pp. 1-239, XP55054460 (uploaded in parts).

Hendry., "AHG 9: On Random Access Point NAL Units", Joint Collaborative Team on Video Coding (JCT-VC) of ITU-T SG 16 WP 3 and ISO/IEC JTC 1/SC 29/WG 11, 11th Meeting: Shanghai, CN, Oct. 2012, JCTVC-K0166_r1, p. 1-8.

\* cited by examiner

MARKING REFERENCE PICTURES IN VIDEO SEQUENCES HAVING BROKEN LINK PICTURES

This application claims the benefit of:
U.S. Provisional Application No. 61/643,100, filed May 4, 2012,
U.S. Provisional Application No. 61/636,566, filed Apr. 20, 2012, and
U.S. Provisional Application No. 61/667,371, filed Jul. 2, 2012,
the entire content each of which is incorporated herein by reference.

TECHNICAL FIELD

This disclosure generally relates to processing video data and, more particularly, coding of random access point (RAP) pictures in a video sequence.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, transcoders, routers or other network devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other pictures. Pictures may be referred to as frames, and reference pictures may be referred to a reference frames. A video sequence may also be referred to as a bitstream.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure relates to techniques for coding random access point (RAP) pictures in a coded video sequence. In some examples, when a current RAP picture to be decoded is a broken link RAP picture, such as a broken link clean random access (CRA) picture or broken link access picture (BLA picture), a syntax element indicates that none of the pictures prior to the BLA picture in decoding order in a decoded picture buffer are to be output. The syntax element may be provided in an early position in a slice header of the BLA picture and prior to any entropy coded slice header parameters of each slice in the BLA picture. In other examples, when a current RAP picture to be decoded is a BLA picture, all reference pictures in a decoded picture buffer are marked as unused for reference.

In one example, the disclosure describes a method of decoding video data, the method including determining that a current picture is a broken-link access (BLA) picture, and marking a reference picture in a picture storage buffer as unused for reference prior to decoding the BLA picture.

In another example, the disclosure describes a device for decoding video data, the device including a processor configured to determine that a current picture is a broken-link access (BLA) picture and mark a reference picture as unused for reference prior to decoding the BLA picture.

In another example, the disclosure describes a device for decoding video data, the device including means for determining that a current picture is a broken-link access (BLA) picture and means for marking a reference picture as unused for reference prior to decoding the BLA picture.

In another example, the disclosure describes a computer-readable storage medium. The computer-readable storage medium having stored thereon instructions that upon execution cause one or more processors of a device to determine that a current picture is a broken-link access (BLA) picture and mark a reference picture as unused for reference prior to decoding the BLA picture.

The details of one or more examples are set forth in the accompanying drawings and the description below. Other features, objects, and advantages will be apparent from the description and drawings, and from the claims.

DETAILED DESCRIPTION

Figure 1:
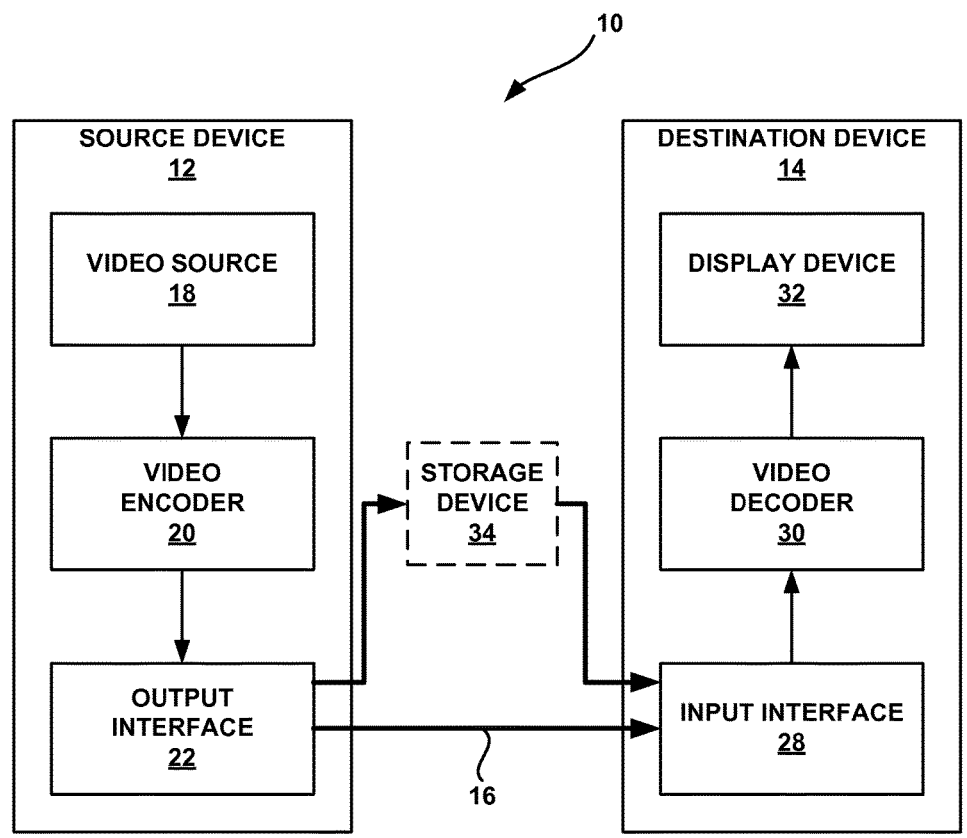
FIG. 1 is a block diagram illustrating an example video encoding and decoding system that may utilize the techniques described in this disclosure.

This disclosure describes various video coding designs, related to pictures that can be used, for example, as random access points or stream adaptation points, such as a temporal layer switching point, or the like. For example, this type of picture could be a switching point for adaptation of bit rate, frame rate or spatial resolution, each of which will be referred to generally as RAP pictures in this disclosure. In some cases, a video encoder or video decoder may code a picture or pictures that are positioned, in a video sequence, after a RAP picture in decoding order, but positioned before the random access point or stream adaptation point, such as a temporal layer switching point in output order, i.e., display order. These pictures may be referred to as leading pictures. Leading pictures are pictures that follow a RAP picture in decoding order but precede the RAP picture in output order. More specifically, these pictures may be referred to as leading pictures of the RAP picture.

A clean random access (CRA) picture is a type of RAP picture. The leading pictures of a current CRA picture may be correctly decoded if the decoding starts from an instantaneous decoding refresh (IDR) or CRA picture that is positioned in the video sequence before the current CRA picture. However, the leading pictures of a CRA picture cannot be correctly decoded when random access from the current CRA picture occurs. This is because the leading pictures, i.e., the pictures that are positioned after the current CRA picture in decoding order but before the current CRA picture in output order, may point to blocks for prediction reference in prior pictures that are unavailable, (e.g., pictures prior to the BLA picture in decoding order).

In particular, pictures that reside prior to the current CRA picture in decoding order are unavailable when random access decoding starts from the current CRA picture. Accordingly, the leading pictures are not decodable in this case, and are typically discarded when random access decoding starts at a CRA picture. To prevent error propagation from pictures that may not be available depending on where the decoding starts, all pictures that follow a CRA picture both in decoding order and output order do not use any pictures that precede the CRA picture either in decoding order or output order (which includes the leading pictures) as reference pictures.

For the case where leading pictures are not decodable e.g., when decoding starts from an earlier RAP picture, a CRA picture may include a broken link flag. This flag indicates that leading pictures of the CRA picture are not decodable, for example, because a reference picture is not valid for use in decoding the leading picture due to a change of the bitstream being decoded. Such a CRA picture may be referred to as a broken link clean random access (BLC) picture or a broken link access (BLA) picture.

A broken link may generally refer to a location in a bitstream in which it is indicated that some subsequent pictures in decoding order may contain significant visual artifacts due to unspecified operations performed in the generation of the bitstream. Instead of, or in addition to, using a broken link flag, a BLC (or analogous BLA) picture may be used to indicate a broken link in a video sequence. A BLA or BLC picture may be used, for example, for bitstream splicing by any of a variety of devices, such as a server, media-aware network element (MANE), or video editor/splicer. Again, a BLC picture may be considered generally analogous to a BLA picture, as described in HEVC WD9 (see below). Although the terminology is slightly different, the BLC or BLA picture may generally refer to a CRA or temporal layer access (TLA) picture for which leading pictures are not decodable, these pictures may not be decodable, for example, when decoding starts from an earlier RAP picture.

In various examples of this disclosure, for a BLA or BLC picture, leading pictures are considered to be not decodable, with the understanding that reference pictures prior to the BLA or BLC picture in decoding order, e.g., prior to a splice point, are not available. In accordance with an example of this disclosure, to decode a current BLA or BLC picture, reference pictures in a decoded picture buffer may be marked as unused for reference by a decoder. In particular, reference pictures in the decoded picture buffer (DPB) may be marked as unused for reference by the decoder when the current picture to be decoded is a BLA or BLC picture. In another example, for decoding of a BLA or BLC picture, an encoder or other device may generate, and a decoder may receive, a syntax element such as a flag, e.g., a no_output_of_prior_pics_flag, indicating that none of the reference pictures prior to a CRA picture or a BLA (or BLC) picture that may be stored in the DPB are to be output. In some examples, this flag or other syntax element may be placed, by an encoder or other device, early in a slice header of a BLA (or BLC) or CRA picture, e.g., before elements that are entropy decoded, so that the flag can be more easily decoded and the information may be available earlier in the decoding process or easily accessible to other entities than a video decoder. For example, so that less capable devices, such as a Media Aware Network Element (MANE) may have access to the information without requiring entropy decoding, the no_output_of_prior_pics_flag may be positioned in an earlier position in the slice header and to precede entropy-coded slice header parameters.

In another example, a coder may process NAL unit types assigned to indicate when BLA (or BLC) or CRA pictures have and do not have leading pictures. Note that BLA pictures are substantially similar to BLC pictures. In general, the change from BLC pictures to BLA pictures is a change in terminology, although processing of BLA pictures may also include the addition of the NAL unit types described herein. For example, NAL unit types may include NAL unit type 16, BLA_W_LP (BLA with leading picture); NAL unit type 17, BLA_W_DLP (BLA with decodable leading picture but no non-decodable leading picture); and NAL unit type 18, BLA_N_LP (BLA with no leading picture) are included. In some examples, these NAL unit types may be used to indicate whether a BLA picture may include both decodable and non-decodable leading pictures, only decodable leading pictures, or no leading pictures at all. When BLA pictures do not have non-decodable leading pictures all the associated leading pictures, if present, are decodable.

The High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG) is described in various working drafts. A recent draft of the HEVC standard, referred to as "HEVC Working Draft 6" or "WD6," is described in document JCTVC-H1003, Bross et al., "High efficiency video coding (HEVC) text specification draft 6," Joint Collaborative Team on Video Coding (JCT-VC) of ITU-T SG16 WP3 and ISO/IEC JTC1/SC29/WG11, 8th Meeting: San Jose, Calif., USA, 01-10 Feb. 2012, which, as of 4 May 2012, is downloadable from http://phenix.int-evry.fr/jct/doc_end_user/documents/8_San%20Jose/wg11/JCTVC-H1003-v22.zip, the entire content of which is incorporated herein by reference. A more recent Working Draft (WD) of HEVC, referred to as HEVC WD9 hereinafter is described in document JCTVC-K1003v13, Bross et al., "High efficiency video coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, 10-19 Oct., 2012, which, as of Dec. 27, 2012, is downloadable from http://phenix.int-evry.fr/jct/doc_end_user/documents/11_Shanghai/wg11/JCTVC-K1003-v13.zip, the entire content of which is incorporated herein by reference. In WD9, the BLC picture terminology used to refer to broken link CRA pictures has been changed to BLA picture terminology. Accordingly, the BLC and BLA terminology may be used generally interchangeably in this disclosure to refer to a broken link CRA picture.

Other example video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

Various aspects of RAP pictures will now be described. Random access generally refers to a decoding of a video bitstream starting from a coded picture that is not the first coded picture in the bitstream. Random access to a bitstream may be needed in many video applications, such as broadcasting and streaming, e.g., for users to switch between different channels, to jump to specific parts of the video, to support bitstream splicing, or to switch to a different bitstream for stream adaptation (of the bit rate, frame rate, spatial resolution, and so on). A video application may insert RAP pictures, many times in regular intervals, and/or at selected locations, into the video bitstream to allow for this feature.

Encoders and decoder may use the instantaneous decoder refresh (IDR) picture for random access. However, since an IDR picture starts a coded video sequence and always cleans the decoded picture buffer (DPB), pictures following the IDR in decoding order cannot use pictures decoded prior to the IDR picture as reference pictures. Consequently, bitstreams relying on IDR pictures for random access can have significantly lower coding efficiency. To improve the coding efficiency, the concept of clean random access (CRA) pictures has been introduced in the developing HEVC standard to allow pictures that follow the CRA picture in decoding order but precede it in output order to use pictures decoded before the CRA picture as reference. Hence, the CRA picture may be used for random access as the first decoded picture in a video sequence, or may be decoded as part of a video sequence for which earlier RAP (e.g. IDR or CRA) pictures have been decoded.

Pictures that follow a CRA picture in decoding order but precede the CRA picture in output order are referred to as leading pictures of the CRA picture. The leading pictures of a CRA picture can be correctly decoded if the decoding starts from a RAP picture before the current CRA picture. However, the leading pictures of a CRA picture cannot be correctly decoded when random access from the CRA picture occurs. Accordingly, as discussed above, in the HEVC process, these leading pictures are typically discarded during the random access decoding of the CRA picture. To prevent error propagation from reference pictures that may not be available depending on where the decoding starts, all pictures that follow a CRA picture both in decoding order and output order shall not use any picture that precedes the CRA picture either in decoding order or output order (which includes the leading pictures) as reference.

Random access functionalities are supported in H.264/AVC with the recovery point SEI message. An H.264/AVC decoder implementation may or may not support the functionality. In HEVC, a bitstream starting with a CRA picture is considered as a conforming bitstream. When a bitstream starts with a CRA picture, the leading pictures of the CRA picture may refer to unavailable reference pictures and hence cannot be correctly decoded. However, the HEVC standard specifies that the leading pictures of the starting CRA picture are not output, hence the name "clean random access" for a CRA picture. For establishment of bitstream conformance requirements, HEVC specifies a decoding process to generate unavailable reference pictures for decoding of the non-output leading pictures, i.e., the leading pictures that are not output. However, conforming decoder implementations are not required to follow that decoding process, as long as the decoder implementation can generate identical output compared to when the decoding process is performed from the beginning of the coded video sequence.

In HEVC, a conforming bitstream may contain no IDR pictures at all, and consequently may contain a subset of a coded video sequence or an incomplete coded video sequence. In HEVC WD6, a coded video sequence is defined as follows.

A coded video sequence is a sequence of access units that includes, in decoding order, an IDR access unit followed by zero or more non-IDR access units including all subsequent access units up to but not including any subsequent IDR access unit.

A concept of "CRA pictures with broken links" was described in document JCTVC-I0404, Sullivan et al., "CRA pictures with broken links," Joint Collaborative Team on Video Coding (JCT-VC) of ITU-T SG16 WP3 and ISO/IEC JTC1/SC29/WG11, 9th Meeting: Geneva, CH, 27 Apr.-7 May, 2012, which, as of Dec. 27, 2012, is downloadable from: http://phenix.int-evry.fr/jct/doc_end_user/documents/9_Geneva/wg11/JCTVC-I0404-v1.zip, the entire content of which is incorporated herein by reference. Compared to the CRA concept included in HEVC WD6, in one example, it is proposed in JCTVC-I0404 to additionally allow CRA pictures that are not at the beginning of the bitstream to have non-decodable leading pictures like a CRA picture that begins the bitstream can have. In HEVC WD6, a CRA picture that starts a bitstream is allowed to be followed (in bitstream order, also referred to as decoding order) by leading pictures that cannot be decoded due to missing reference pictures prior to the BLA picture in decoding order. However, a CRA picture that falls in the middle of a bitstream is not allowed to have such non-decodable leading pictures. In one example, removing this constraint is proposed in JCTVC-I0404 by adding a "broken link" flag that would indicate the potential presence of such non-decodable leading pictures.

The "broken link" flag is proposed in JCTVC-I0404 as picture-level information of CRA pictures in the slice header or some other place for picture-level information. In an example that includes an adaptation parameter set (APS) the "broken link" flag may be part of the APS. Some standards do not provide for an APS, however. When the flag is equal to 1, the bitstream would be allowed to contain leading pictures of the CRA picture that are not decodable due to missing preceding reference pictures even though the bitstream starts with an IDR picture or a CRA picture earlier in bitstream order.

For a CRA picture with the "broken link" flag equal to 1, in addition to being allowed to have non-decodable leading pictures as discussed herein, its picture order count (POC) most significant bits (MSBs) are set to 0. In addition, the CRA picture with the broken link flag equal to 1 may include a no_output_of_prior_pics_flag that causes the CRA picture to act in the same way as for an IDR picture, and a random_access_pic_id that causes the CRA picture to act in the same way as the idr_pic_id of IDR pictures in HEVC WD6. Additionally, the current idr_pic_id as in HEVC WD6 is renamed to random_access_pic_id and its constraints should be made to apply to both CRA pictures and IDR pictures rather than just to IDR pictures only. Like an IDR picture, a CRA picture with broken_link_flag equal to 1 could activate a different sequence parameter set (SPS), change the picture size, etc.

In some examples, the signaling of the "broken link" flag in in the slice header or an APS would require an entity (e.g., a server, media-aware network element (MANE), or video editor/splicer) that changes a normal CRA picture to a so-called broken link clean random access (BLC) picture, also referred to as a BLA picture in this disclosure. This entity ordinarily would need to be capable of entropy encoding and parsing the slice header and/or APS to encode the broken link flag. Likewise, an entity (e.g., a server, MANE, or video editor) that identifies a BLA or BLC picture, when needed, would need to be capable of entropy decoding and parsing the slice header and/or the APS to find the flag.

In some examples, a broken-link CRA (BLA) picture might not be allowed to activate a sequence parameters set (SPS), picture parameter set (PPS) or APS (when referred to by the picture) if the parameter set ID is the same as the active SPS, PPS or APS. However, since a BLA picture is usually originated from a different bitstream than the previous picture in decoding order, e.g., in the case of bitstream splicing, the BLA or BLC picture and previous picture may use different SPS raw bit sequence payloads (RBSPs), PPS RBSPs, and APS RBSPs. Accordingly, in some examples, it is likely that both the BLA or BLC picture and the previous picture in decoding order may refer to (directly or indirectly) the same value of SPS or PPS ID. Additionally, in some examples, it is also possible for pictures to refer to the same value of APS ID. Therefore, use of the active SPS, PPS, or APS for the previous picture in decoding is very likely to cause decoding of the BLA or BLC picture and the following pictures (not just the leading pictures) to be incorrect.

In examples that do not include the random_access_pic_id and no_output_of_prior_pics_flag syntax elements in normal CRA pictures, an entity (e.g., a server, media-aware network element (MANE), or video editor/splicer) that changes a normal CRA picture to be a BLA or BLC picture, when needed, would need to be capable of entropy encoding or decoding and parsing the slice header and/or APS to encode the syntax elements.

Since a BLA or BLC picture would usually originate from a different bitstream than the previous picture in decoding order, if no_output_of_prior_pics_flag is equal to 0, the decoded picture buffer may overflow. As a result, all of the following pictures in decoding order may be decoded incorrectly or the decoder may even crash.

When a part of a first bitstream and a part of a second bitstream, wherein the part of the second bitstream starts from a CRA picture (picA), are spliced or concatenated, it may be possible to not change the CRA picture to a BLA or BLC picture. Rather, it is possible to keep picA as a CRA picture in a case when decoding starts from the previous CRA picture or IDR picture or BLA or BLC picture and the decoding quality of the leading pictures of the CRA picture picA is acceptable though not perfect (e.g., when the checksums of one or more of the leading pictures do not match with the checksums signaled in the decoded picture hash supplemental enhancement information (SEI) messages as in HVEC WD6). However, this approach lacks a mechanism to indicate the above information in the bitstream.

To address some of the above issues, in an example, instead of using a flag to indicate that a CRA picture has a broken link, or indicate a broken-link CRA (BLA) picture, a distinct NAL unit type (e.g., NAL unit type equal to 2 that is reserved in HEVC WD6) may be used. In such an example, the information provided by the NAL units may be available without entropy encoding or decoding. This approach may allow for an entity (e.g., a server, media-aware network element (MANE), or video editor/splicer) to change a normal CRA picture, for which if not starting the bitstream all the associated leading pictures must be decodable (i.e., can be correctly decoded), to be a BLA or BLC picture, when needed. This may also permit an entity (e.g., a server, MANE, or video editor) to identify a BLA or BLC picture when needed.

In some examples, instead of allowing a BLC picture to activate a different SPS, a BLC picture is required to activate an SPS, even if the SPS ID referred to by the BLC picture is the same as the SPS ID of the active SPS for the previous picture in decoding order. This may be performed indirectly through a PPS as in HEVC WD6 or by other methods, e.g., indirectly through a group parameter set as described in JCTVC-I0338, or directly, e.g., when the SPS ID is directly included in the slice header, or indirectly through a buffering period SEI message. A BLC picture may be required to activate an SPS because a BLC picture was typically from a different bitstream than the previous picture in decoding order. Additionally, typically different SPS RBSPs are applied with identical or different SPS IDs.

A BLC picture may also be used to activate a PPS. This may be the case even if the PPS ID referred to by the BLC picture (indirectly through a group parameter set as described in JCTVC-I0338, or directly, e.g., when the PPS ID is directly included in the slice header as in HEVC WD6) is the same as the PPS ID of the active PPS for the previous picture in decoding order. This is again because a BLC picture was typically from a different bitstream than the previous picture in decoding order, and typically different PPS RBSPs are applied, with identical or different PPS IDs.

In some examples, a BLA or BLC picture is also required to activate an APS if it refers to an APS, even if the APS ID referred to by the BLA or BLC picture is the same as the APS ID of the active PPS for the previous picture in decoding order. This is again because a BLA or BLC picture was typically from a different bitstream than the previous picture in decoding order. Additionally, typically different APS RBSPs are applied, with identical or different APS IDs.

A BLA or BLC picture may be considered a special type of CRA picture and may be defined as a coded picture for which the NAL unit type is the one for BLC picture (e.g., NAL unit type equal to 2 that is reserved in HEVC WD6). This definition may applied, with different terminology but similar effect, for BLA pictures, as described in HEVC WD9. The same decoding process for a non-BLA CRA picture when it starts the bitstream and the associated leading pictures may be applied for decoding a BLA or BLC picture and the associated leading pictures, even if the BLA or BLC picture is not the first picture in the bitstream. Alternatively, BLA or BLC pictures may be excluded from CRA pictures, i.e., a BLA or BLC picture may be considered not a CRA picture. In that case, the same decoding process for a CRA picture when it starts the bitstream and the associated leading pictures is applied for decoding a BLA or BLC picture and the associated leading pictures, even if the BLA or BLC picture is not the first picture in the bitstream. In the following discussion, it is assumed that this alternative applies.

In some examples, a BLA or BLC access unit may be defined as an access unit in which the coded picture is a BLA or BLC picture. The definition of coded video sequence may be changed as follows: a sequence of access units that includes, in decoding order, an IDR access unit or a BLA or BLC access unit followed by zero or more non-IDR and non-BLA access units including all subsequent access units up to but not including any subsequent IDR or BLA access unit.

Instead of having random_access_pic_id and no_output_of_prior_pics_flag for all IDR pictures and BLA pictures only as in JCTVC-I0404, in another approach, the two fields are always present for all IDR pictures, BLA, and all CRA pictures. For each CRA picture, no_output_of_prior_pics_flag is required to be equal to 0. In some examples it may be easier for an entity (e.g., a server, media-aware network element (MANE), or video editor/splicer) to change a CRA picture to be a BLA picture, when needed.

In another alternative example, for a BLA picture, it may be required that no_output_of_prior_pics_flag is equal to 1. Alternatively, each BLA picture does not have no_output_of_prior_pics_flag signaled, but the picture output behavior is the same as if it had no_output_of_prior_pics_flag equal to 1. As a further alternative, each BLA picture does have no_output_of_prior_pics_flag signaled, but the picture output behavior is the same as if it had no_output_of_prior_pics_flag equal to 1, regardless of the value of the signaled no_output_of_prior_pics_flag.

The picture order count (POC) most significant bit (MSB) value for a BLA picture may be signaled, e.g., in the slice header. If it is signaled, the value would still be considered as equal to 0 in the decoding process, regardless of the value. Alternatively, the signaled POC MSB value is used in the decoding process—but then the splicer needs to check and possibly change the value to be consistent with the POC values of earlier pictures in decoding order.

When a part of a first bitstream and a part of a second bitstream, wherein the part of the second bitstream starts from a CRA picture picA, are spliced or concatenated, the splicer can keep a picture from the first bitstream as a CRA picture. In an example, when decoding starts from the previous CRA picture, IDR picture, or BLA picture, the decoding quality of the leading pictures of the CRA picture may be acceptable though not perfect. For example, the decoding quality may be acceptable when the checksums of one or more of the leading pictures do not match with the checksums signaled in the decoded picture hash SEI messages as in HVEC WD6.

An indication of the above information may be signaled in the bitstream. The information may be signaled through an indication associated with a CRA picture from the first bit stream, e.g., as a flag in the NAL unit header or the slice header or the referred APS, or an SEI message associated with a CRA picture from the first bit stream. The flag may be named exact_match_flag. In an example, a value 1 indicates that the checksum of each leading picture associated with a CRA picture from the first bit stream matches the checksum signaled in the decoded picture hash SEI message, if present. A value 0 indicates that the checksum of each leading picture associated with a CRA picture from the first bit stream may or may not match the checksum signaled in the decoded picture hash SEI message, if present.

A discussion of signaling of leading pictures and presence of leading pictures of CRA pictures is provided in JCTVC-I0275, available at: http://phenix.int-evry.fr/jct/doc_end_user/documents/9_Geneva/wg11/JCTVC-I0275-v2.zip; and document JCTVC-I0277, available at: http://phenix.int-evry.fr/jct/doc_end_user/documents/9_Geneva/wg11/JCTVC-I0277-v3.zip for discussion of signaling of leading pictures and presence of leading pictures of CRA pictures, the entire contents of which each is incorporated herein by reference. In some examples, a similar idea for signaling of presence of leading pictures of CRA pictures may be applied to BLA or BLC pictures.

The use of broken link RAP pictures, such as BLA or BLC pictures, may present some issues. Various refinements may be provided to address such issues associated with broken link RAP pictures, such as BLA or BLC pictures, and other existing video random access approaches.

One issue is that defining only one NAL unit type for leading pictures associated with a CRA picture may not be sufficient, as a leading picture may also be a temporal layer access (TLA) picture. Thus, encoders and decoder implementing the systems and methods described herein may need more NAL unit types to identify NAL units belonging to leading pictures that are also TLA pictures and NAL units belonging to leading pictures that are not TLA pictures.

As another issue, if a BLA or BLC picture changes the spatial resolution of the pictures in the video sequence, then the current decoding process as specified in HEVC WD6 for leading pictures of a CRA picture that starts the bitstream cannot be directly applied for leading pictures of the BLA or BLC picture. In some cases, it may appear that the spatial resolution is different for a current picture and a reference picture for the current picture. As another issue, in the decoding process specified in HEVC WD6, the syntax element slice_type may be unnecessarily present in the slice header of slices of IDR, CRA, and BLA or BLC pictures.

This disclosure describes various techniques for RAP pictures in general and for coding broken link RAP pictures (e.g., BLA pictures) in particular in a video sequence. Some of the techniques may address one or more of the issues described above, while some of the techniques may provide additional features that may be useful in coding random access pictures.

In some examples, when a current RAP picture to be decoded is a broken link RAP picture, such as a broken link clean random access (CRA) picture (BLA picture), a syntax element indicates that none of the reference pictures prior to the BLA picture in decoding order in a decoded picture buffer are to be output. This syntax element may be encoded by an encoder, and decoded by a decoder. Also, the syntax element may be provided in an early position in a slice header of a current broken link RAP picture and prior to any entropy coded slice header parameters of each slice in the current broken link RAP picture. Providing the syntax element prior to entropy coded syntax elements, e.g., prior to any ue(v) element, may permit a less capable device, in some examples, to interpret the syntax element without the need for entropy coding. In other examples, when a current RAP picture to be decoded is a broken link RAP picture, all reference pictures in a decoded picture buffer are marked as unused for reference. This feature may permit a standard decoding process to be applied for leading pictures of a BLA or BLC picture even if the BLA or BLC picture changes spatial resolution. These and other example techniques are described in this disclosure.

FIG. 1 is a block diagram illustrating an example video encoding and decoding system 10 that may utilize the techniques described in this disclosure. As illustrated in FIG. 1, system 10 includes a source device 12 that generates encoded video data that a destination device 14 may decode later. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

In some cases, video encoder 20 may encode a picture or pictures that are after a random access point or stream adaptation point, such as a temporal layer switching point. For example, this could be a switching point for adaptation of bit rate, frame rate or spatial resolution. One or more of these pictures may be leading pictures of a CRA picture in a video sequence. A decoder may decode the leading pictures of a CRA picture correctly if the decoding of the video sequence starts from a RAP picture before the current CRA picture in the video sequence. However, the leading pictures of a CRA picture cannot be correctly decoded when random access from the CRA picture occurs. For example, leading pictures may point to blocks for prediction reference that are unavailable. Accordingly, the leading picture may not be decodable at video decoder 30. Accordingly, a destination device 14 may typically discard these leading pictures during the random access decoding.

In another example, for a BLA or BLC picture, encoder 20 may encode a flag, e.g., a no_output_of_prior_pics_flag (which may be more correctly referred to as a syntax element) so that none of the prior pictures in the DPB are output. In some examples, this flag, or syntax element, may be early in the slice header before entropy decoding so that it can be more easily decoded and the information is available earlier in the coding process. For example, so that less sophisticated devices, such as a MANE, may have access to the information without requiring a decoder since, for example, the no_output_of_prior_pics_flag does not need to be entropy decoded. As an illustration, the no_output_of_prior_pics flag may be presented as a non-entropy coded syntax element such as, e.g., as a fixed length u(l) element, instead of an entropy coded syntax element, such as, e.g., a variable length ue(v) element. The no_output_of_prior_pics flag may be presented, for example, immediately after a first_slice_segment_in_pic flag, and before any entropy coded syntax elements.

In one example, video decoder 30 may mark pictures stored in a reference picture buffer as unused for reference when, for example, the use of these pictures may result in an incorrectly decoded picture. For example, a reference picture that precedes a BLA or BLC picture in decode order or output order may be unusable for reference for a leading picture that follows the BLA or BLC picture in decode order. Accordingly, the reference picture may be marked as unused for reference by video decoder 30 in response to receiving a reference picture that precedes a BLA or BLC picture in decode order or output order may be unusable for reference for a leading picture that follows the BLA or BLC picture in decode order.

In an example, a video encoder 20 may be configured to include NAL unit types assigned to indicate when BLA or BLC pictures have and do not have leading pictures. For example, in one standard, NAL unit types 16, BLA_W_LP (BLA with leading picture); 17, BLA_W_DLP (BLA with decodable leading picture); and 18, BLA_N_LP (BLA no leading picture) are included.

In an example, video encoder 20 may process NAL unit types assigned to indicate when BLA pictures have and do not have leading pictures. For example, video encoder 20 may encode pictures according to one of a plurality of different network abstraction layer (NAL) unit types. The plurality of NAL unit types includes one or more of (1) a coded slice of a broken link access (BLA) picture, wherein the BLA picture is a BLA picture with associated leading pictures in a bitstream, (2) a coded slice of a BLA picture, wherein the BLA picture is a BLA picture with associated decodable leading pictures in the bitstream, and (3) a coded slice of a BLA picture, wherein the BLA picture is a BLA picture with no associated leading pictures in the bitstream.

Destination device 14 may receive the encoded video data. The destination device may decode the received data via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 34. Similarly, encoded data may be accessed from storage device 34 by input interface. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12. Destination device 14 may access stored video data from storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 34 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 34, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server.

In some examples, video decoder 30 of destination device 14 may decode a picture or pictures that are after a random access point or stream adaptation point, such as a temporal layer switching point. For example, this could be a switching point for adaptation of bit rate, frame rate (i.e., temporal layer switching point), or spatial resolution. One or more of these pictures may be leading pictures. The leading pictures cannot be correctly decoded when random access from a BLA or BLC picture occurs.

In an example, to prevent error propagation from reference pictures that may not be available depending on where the decoding starts, video decoder 30 may not use any picture that precedes the BLA or BLC picture either in decoding order or output order (which includes the leading pictures) as reference pictures.

In various examples, video decoder 30 may mark all reference pictures in the DPB as unused for reference before decoding the BLA picture when decoding a BLA or BLC picture. For example, video decoder 30 may mark reference pictures in the decoded picture buffer (DPB) as unused for reference.

In another example, encoder 20 may include in the bitstream, and decoder 30 may receive, a flag or other syntax element, e.g., a no_output_of_prior_pics_flag, for a BLA picture to be decoded. The flag, when equal to 1, indicates that none of the prior pictures in the DPB are output for display. In particular, when no_output_of_prior_pics_flag is equal to 1, decoder 30 empties all picture storage buffers in the decoded picture buffer without output of the pictures they contain. In some examples, this flag or syntax element may be presented very early in the slice header before entropy decoding so that it can be more easily decoded, without the need for entropy coding, and the information is available earlier in the coding process. For example, so that less sophisticated devices, such as a MANE may have access to the information without requiring a decoder since, for example, the no_output_of_prior_pics_flag does not need to be entropy decoded.

In another example, video decoder 30 may process NAL unit types assigned to indicate when BLA or BLC pictures have and do not have leading pictures. (Again, as described above BLA pictures are, conceptually generally the same as BLC pictures, in that BLA and BLC pictures signify broken link CRA pictures.). In one example, video decoder 30 may decode pictures according to one of a plurality of different network abstraction layer (NAL) unit types. The plurality of NAL unit types includes one or more of (1) a coded slice of a broken link access (BLA) picture, wherein the BLA picture is a BLA picture with associated leading pictures in a bitstream, (2) a coded slice of a BLA picture, wherein the BLA picture is a BLA picture with associated decodable leading pictures in the bitstream, and (3) a coded slice of a BLA picture, wherein the BLA picture is a BLA picture with no associated leading pictures in the bitstream.

In some examples, video decoder 30 is configured to mark all reference pictures as unused for reference if it detects a BLA NAL unit type. If a BLA NAL unit type is detected by decoder 30, the reference pictures are not valid for decoding the BLA picture or any pictures following the BLA picture in decoding or output order.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Figure 2:
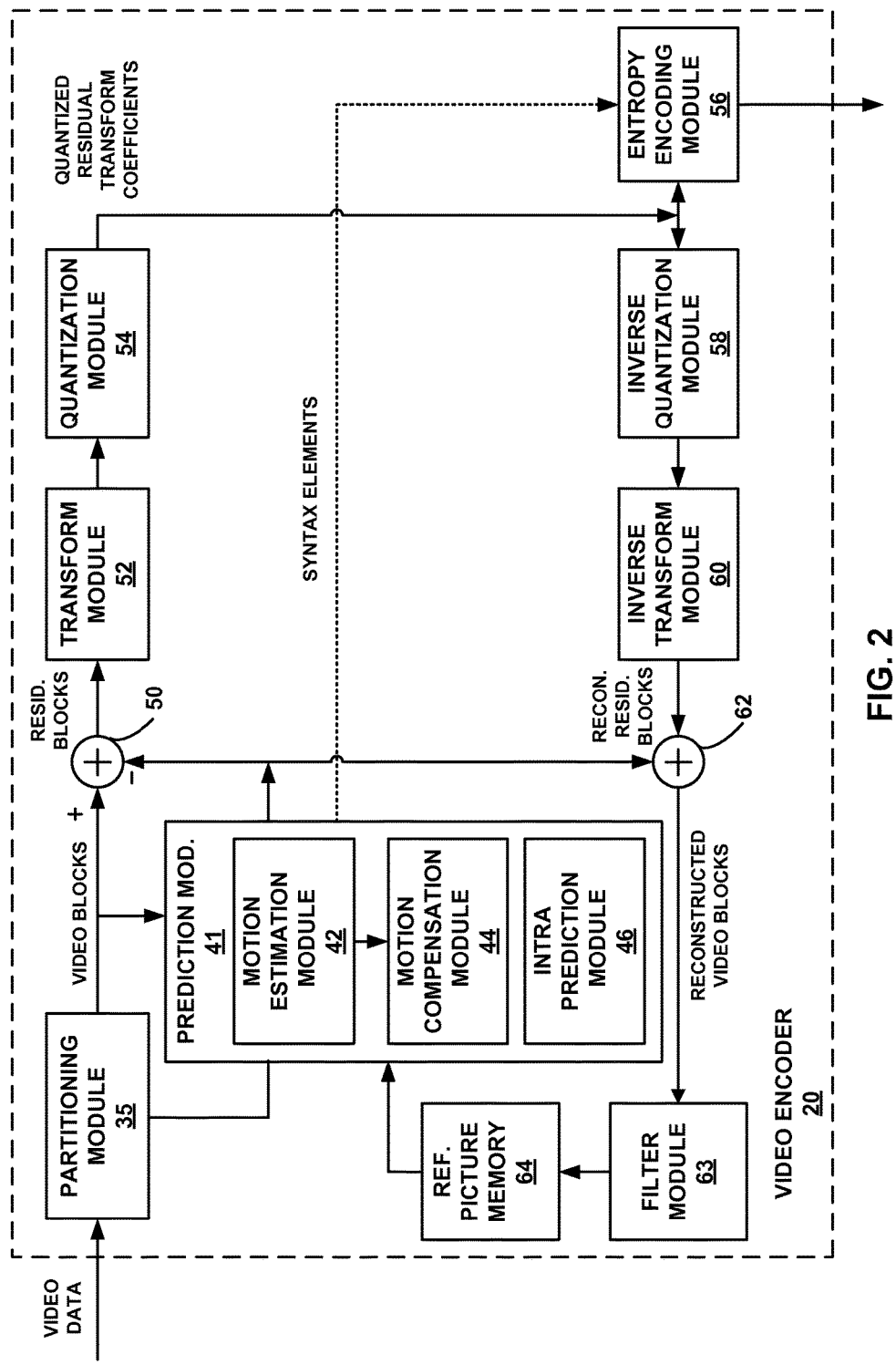
FIG. 2 is a block diagram illustrating an example video encoder that may implement the techniques described in this disclosure.

FIG. 2 is a block diagram illustrating an example video encoder 20 that may implement the techniques for coding broken link RAP pictures described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning module 35, prediction module 41, filter module 63, reference picture memory 64, summer 50, transform module 52, quantization module 54, and entropy encoding module 56. Prediction module 41 includes motion estimation module 42, motion compensation module 44, and intra prediction module 46. For video block reconstruction, video encoder 20 also includes inverse quantization module 58, inverse transform module 60, and summer 62. Filter module 63 is intended to represent one or more loop filters such as a deblocking filter, an adaptive loop filter (ALF), and a sample adaptive offset (SAO) filter. Although filter module 63 is illustrated in FIG. 2 as being an in loop filter, in other configurations, filter module 63 may be implemented as a post loop filter.

As illustrated in FIG. 2, video encoder 20 receives video data, and partitioning module 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction module 41 may select one of a plurality of possible coding modes, such as one of a plurality of intra coding modes or one of a plurality of inter coding modes, for the current video block based on error results (e.g., coding rate and the level of distortion). Prediction module 41 may provide the resulting intra- or inter-coded block to summer 50 to generate residual block data and to summer 62 to reconstruct the encoded block for use as a reference picture.

As discussed above, in some cases, video encoder 20 may encode a random access point or stream adaptation point, such as a temporal layer switching point, such as a BLA or BLC picture. For example, the encoding may occur within entropy encoding module 56, which may perform both entropy and non-entropy encoding. One or more of these pictures may be leading pictures of the CRA picture. The leading pictures of a CRA picture may be correctly decoded if the decoding starts from a RAP picture before the current CRA picture. However, the leading pictures of a CRA picture cannot be correctly decoded when random access from the CRA picture occurs. For example, leading pictures may point to blocks for prediction reference that are unavailable. Accordingly, the leading picture may not be decodable at video decoder 30. Accordingly, these leading pictures are typically discarded during the random access decoding.

In an example, video encoder 20 may provide a flag in the slice header, e.g., a no_output_of_prior_pics_flag or syntax element so that none of the prior pictures, i.e., pictures prior to the BLA or BLC picture, in the DPB are output. In some examples, this flag (or syntax element) may be early in the slice header before entropy encoding so that it can be more easily decoded at decoder 30, for example, and the information may be available earlier in the coding process. The syntax element or flag may be encoded, e.g., in a slice header for a BLA or BLC picture, by entropy encoding module 56 (which may perform non-entropy encoding). This may be useful, for example, for intermediate devices such as a MANE, so that the information provided by the syntax element or flag may be available to the intermediate device without entropy decoding, although it may also be helpful to a decoder to have access to such information prior to entropy decoding.

For example, video encoder 20 (e.g. entropy encoding module 56) may include a syntax element that indicates that a picture storage buffer is emptied without outputting any pictures from the picture storage buffer. The syntax element, when set, may cause pictures prior to a current picture in decoding order and residing in the picture storage buffer at the time of the decoding of the current picture to be emptied from the picture storage buffer without being output. In some examples, the syntax element may be one of a plurality of syntax elements. Additionally, the plurality of syntax elements may include entropy coded slice header syntax elements and non-entropy coded slice header syntax elements. In an example, the syntax element that indicates that a picture storage buffer is emptied without outputting any pictures from the picture storage buffer is included in the slice header before any entropy coded slice header syntax element so that the syntax element itself is not entropy coded.

In some examples, the syntax element may be a no_output_of_prior_pics_flag and the no_output_of_prior_pics_flag may be included in the slice header immediately after a first_slice_in_pic_flag. The first_slice_in_pic_flag may be a flag that indicates whether a slice is the first slice, in decoding order, of a picture.

In an example, a video encoder 20 may be configured to include NAL unit types assigned to indicate when BLA or BLC pictures have and do not have leading pictures. For example, in one standard, NAL unit types 16, BLA_W_LP (BLA with leading picture); 17, BLA_W_DLP (BLA with decodable leading picture); and 18, BLA_N_LP (BLA no leading picture) are included. These NAL unit types may be encoded by entropy encoding module 56 (which may perform non-entropy encoding). Accordingly, based on NAL unit type, a decoder may know when a BLA picture has a leading picture and when the leading picture is not decodable, e.g., when decoding starts from an earlier RAP picture. Accordingly, this information might be used to determine when leading pictures may be marked as unused for reference, which may trigger the decoder to mark reference pictures in the decoded picture buffer as unused for reference.

Intra prediction module 46 within prediction module 41 may perform intra-predictive coding of the current video block relative to one or more neighboring blocks in the same frame or slice as the current block to be coded to provide spatial compression. Motion estimation module 42 and motion compensation module 44 within prediction module 41 perform inter-predictive coding of the current video block relative to one or more blocks for prediction reference in one or more reference pictures to provide temporal compression.

Motion estimation module 42 may be configured to determine the inter-prediction mode for a video slice according to a predetermined pattern for a video sequence. The predetermined pattern may designate video slices in the sequence as P slices, B slices or GPB slices. Motion estimation module 42 and motion compensation module 44 may be highly integrated, but are illustrated separately for conceptual purposes. Motion estimation, performed by motion estimation module 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation module 42 may perform a motion search relative to the full pixel positions and fractional pixel positions and output a motion vector with fractional pixel precision.

Motion estimation module 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation module 42 sends the calculated motion vector to entropy encoding module 56 and motion compensation module 44.

Motion compensation, performed by motion compensation module 44, may involve fetching or generating the predictive block based on the motion vector determined by motion estimation, possibly performing interpolations to sub-pixel precision. Upon receiving the motion vector for the PU of the current video block, motion compensation module 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation module 44 may also generate syntax elements associated with the video blocks and the video slice for use by video decoder 30 in decoding the video blocks of the video slice.

Intra-prediction module 46 may intra-predict a current block, as an alternative to the inter-prediction performed by motion estimation module 42 and motion compensation module 44, as described above. In particular, intra-prediction module 46 may determine an intra-prediction mode to use to encode a current block. In some examples, intra-prediction module 46 may encode a current block using various intra-prediction modes, e.g., during separate encoding passes, and intra-prediction module 46 (or mode select module 40, in some examples) may select an appropriate intra-prediction mode to use from the tested modes. For example, intra-prediction module 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction module 46 may calculate ratios from the distortions and rates for the various encoded blocks to determine which intra-prediction mode exhibits the best rate-distortion value for the block.

In any case, after selecting an intra-prediction mode for a block, intra-prediction module 46 may provide information indicative of the selected intra-prediction mode for the block to entropy encoding module 56. Entropy encoding module 56 may encode the information indicating the selected intra-prediction mode in accordance with the techniques of this disclosure. Video encoder 20 may include in the transmitted bitstream configuration data. The bitstream may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction module 41 generates the predictive block for the current video block via either inter-prediction or intra-prediction, video encoder 20 forms a residual video block by subtracting the predictive block from the current video block. The residual video data in the residual block may be included in one or more TUs and applied to transform module 52. Transform module 52 transforms the residual video data into residual transform coefficients using a transform, such as a discrete cosine transform (DCT) or a conceptually similar transform. Transform module 52 may convert the residual video data from a pixel domain to a transform domain, such as a frequency domain.

Transform module 52 may send the resulting transform coefficients to quantization module 54. Quantization module 54 quantizes the transform coefficients to further reduce bit rate. The quantization process may reduce the bit depth associated with some or all of the coefficients. The degree of quantization may be modified by adjusting a quantization parameter. In some examples, quantization module 54 may then perform a scan of the matrix including the quantized transform coefficients. Alternatively, entropy encoding module 56 may perform the scan.

Following quantization, entropy encoding module 56 entropy encodes the quantized transform coefficients. For example, entropy encoding module 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding module 56, the encoded bitstream may be transmitted to video decoder 30, or archived for later transmission or retrieval by video decoder 30. Entropy encoding module 56 may also entropy encode the motion vectors and the other syntax elements for the current video slice being coded.

Inverse quantization module 58 and inverse transform module 60 apply inverse quantization and inverse transformation, respectively, to reconstruct the residual block in the pixel domain for later use as a reference block of a reference picture. Motion compensation module 44 may calculate a reference block by adding the residual block to a predictive block of one of the reference pictures within one of the reference picture lists. Motion compensation module 44 may also apply one or more interpolation filters to the reconstructed residual block to calculate sub-integer pixel values for use in motion estimation. Summer 62 adds the reconstructed residual block to the motion compensated prediction block produced by motion compensation module 44 to produce a reference block for storage in reference picture memory 64. The reference block may be used by motion estimation module 42 and motion compensation module 44 as a reference block to inter-predict a block in a subsequent video frame or picture.

Video encoder 20 of FIG. 2 represents an example of a video encoder configured to encode a flag or other syntax element to indicate when reference pictures prior to a BLA picture in decoding order may not be used for as reference pictures according to the techniques of this disclosure.

Figure 3:
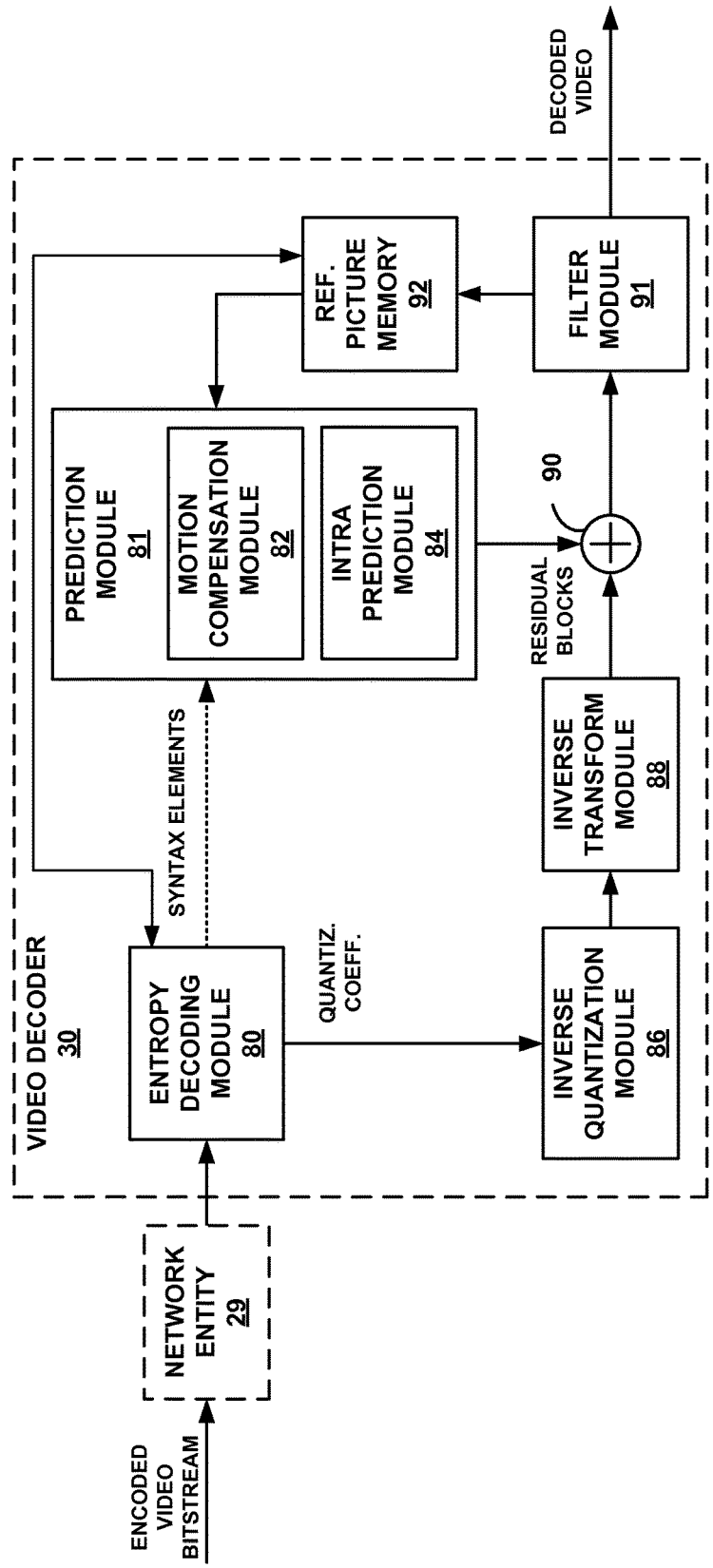
FIG. 3 is a block diagram illustrating an example video decoder that may implement the techniques described in this disclosure.

FIG. 3 is a block diagram illustrating an example video decoder 30 that may implement the techniques described for enhanced support of stream adaptation and splicing based on broken like RAP pictures described above. In the example of FIG. 3, video decoder 30 includes an entropy decoding module 80, prediction module 81, inverse quantization module 86, inverse transformation module 88, summer 90, filter module 91, and reference picture memory 92. Prediction module 81 includes motion compensation module 82 and intra prediction module 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Video decoder 30 may receive the encoded video bitstream from a network entity 29. Network entity 29 may, for example, be a server, a media-aware network element (MANE), a video editor/splicer, or other such device configured to implement one or more of the techniques described above. Network entity 39 may or may not include a video encoder 20. As described above, some of the techniques described in this disclosure may be implemented by network entity 29 prior to network 29 transmitting the encoded video bitstream to video decoder 30. In some video decoding systems, network entity 29 and video decoder 30 may be parts of separate devices, while in other instances, the functionality described with respect to network entity 29 may be performed by the same device that comprises video decoder 30.

As discussed above, in some examples, video decoder 30 may decode a broken link RAP picture, such as a BLA picture, or pictures that are after a random access point or stream adaptation point, such as a temporal layer switching point, such as leading pictures. The leading pictures cannot be correctly decoded when random access from the broken link RAP picture occurs.

In an example, to prevent error propagation from reference pictures that may not be available depending on where the decoding starts, video decoder 30 may not use any picture that precedes the broken link RAP picture either in decoding order or output order (which includes the leading pictures) as reference pictures. For example, prediction module 81 may not use any picture stored in reference picture memory 92 that precedes the broken link RAP picture either in decoding order or output order (which includes the leading pictures) as reference pictures.

In various examples, video decoder 30 may mark all reference pictures in the DPB as unused for reference before decoding the BLA picture as unused for reference. For example, entropy decoding module 80, which may perform entropy and non-entropy decoding, may mark reference pictures in the reference picture memory 92, sometimes referred to as the decoded picture buffer (DPB), as unused for reference. Video decoder 30 (e.g. entropy decoding module 80) may determine that a current picture is a BLA or BLC picture and mark reference pictures in a picture storage buffer as unused for reference prior to decoding the BLA or BLC picture. Determining that a current picture is a BLA or BLC picture may include determining that the current picture is a CRA picture and determining that the current picture is a RAP picture. The current CRA picture is a BLA picture when the current picture is both a CRA picture and a RAP picture. In some examples, this determination by decoder 30 might be made based on the picture having a BLA NAL unit type.

In another example, when decoding a BLA picture, decoder 30 may receive a flag or syntax element in the encoded bitstream, e.g., a no_output_of_prior_pics_flag, so that none of the prior pictures in the DPB are output. In some examples, this flag may be presented early in a slice header, of a slice of a BLA picture, before entropy decoding so that it can be more easily decoded and the information is available earlier in the coding process. The flag or syntax element may be decoded by entropy decoding module 80, which may perform both entropy and non-entropy decoding. Placing the flag or other syntax element early in the slice header before entropy encoding may allow for less sophisticated devices, such as a MANE to have access to the information without requiring an entropy decoder since, for example, the no_output_of_prior_pics_flag does not need to be entropy decoded.

In an example, video decoder 30 may place a syntax element, e.g., a no_output_of_prior_pics_flag, in the bitstream for a decoder to receive. The syntax element may indicate that a picture storage buffer is emptied without outputting any pictures from the picture storage buffer. The syntax element, when set, may cause pictures prior to a current picture in decoding order and residing in the picture storage buffer at the time of the decoding of the current picture to be emptied from the picture storage buffer without being output. In some examples, the syntax element may be one of a plurality of syntax elements. Additionally, the plurality of syntax elements may include one or more entropy coded slice header syntax elements and one or more non-entropy coded slice header syntax elements. In an example, the syntax element that indicates that a picture storage buffer is emptied without outputting any pictures from the picture storage buffer is included in the slice header, e.g., as a u(1) element), before any entropy coded slice header syntax element, e.g., before any ue(v) element. In some examples, the syntax element may be a no_output_of_prior_pics_flag and the no_output_of_prior_pics_flag may be included in the slice header immediately after a first_slice_in_pic_flag and before any entropy coded elements. The first_slice_in_pic_flag may be a flag that indicates whether a slice is the first slice, in decoding order, of a picture.

In another example, video decoder 30 may process NAL unit types assigned to indicate when BLA pictures have and do not have leading pictures. Video decoder 30 may be configured to include NAL unit types assigned to indicate when BLA pictures have and do not have leading pictures. For example, entropy decoding module 80, which may perform entropy and non-entropy decoding, may process the NAL unit types.

In one example, video decoder 30 (e.g., entropy decoding module 80) may decode pictures according to one of a plurality of different network abstraction layer (NAL) unit types. The plurality of NAL unit types includes one or more of (1) a coded slice of a broken link access (BLA) picture, wherein the BLA picture is a BLA picture with associated leading pictures in a bitstream, (2) a coded slice of a BLA picture, wherein the BLA picture is a BLA picture with associated decodable leading pictures in the bitstream, and (3) a coded slice of a BLA picture, wherein the BLA picture is a BLA picture with no associated leading pictures in the bitstream. In an example, the leading picture comprises a picture that precede a random access picture (RAP) in a display order but follows the random access picture in decoding order.

Entropy decoding module 80 of video decoder 30 entropy decodes the bitstream to generate quantized coefficients, motion vectors, and other syntax elements. Entropy decoding module 80 forwards the motion vectors and other syntax elements to prediction module 81. Video decoder 30 may receive the syntax elements at the video slice level and/or the video block level.

When the video slice is coded as an intra-coded (I) slice, intra prediction module 84 of prediction module 81 may generate prediction data for a video block of the current video slice based on a signaled intra prediction mode and data from previously decoded blocks of the current frame or picture. When the video frame is coded as an inter-coded (i.e., B, P or GPB) slice, motion compensation module 82 of prediction module 81 produces blocks for prediction reference for a video block of the current video slice based on the motion vectors and other syntax elements received from entropy decoding module 80. The blocks for prediction reference may be produced from one of the reference pictures within one of the reference picture lists. Video decoder 30 may construct the reference frame lists, List 0 and List 1, using default construction techniques based on reference pictures stored in reference picture memory 92.

Motion compensation module 82 determines prediction information for a video block of the current video slice by parsing the motion vectors and other syntax elements, and uses the prediction information to produce the blocks for prediction reference for the current video block being decoded. For example, motion compensation module 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice. When pictures in the DPB are marked as unused for reference, there are no reference pictures available. Accordingly, video decoder 30 will not be able to decode a leading picture referencing an earlier reference picture for inter-prediction.

Motion compensation module 82 may also perform interpolation based on interpolation filters. Motion compensation module 82 may use interpolation filters as used by video encoder 20 during encoding of the video blocks to calculate interpolated values for sub-integer pixels of reference blocks. In this case, motion compensation module 82 may determine the interpolation filters used by video encoder 20 from the received syntax elements and use the interpolation filters to produce blocks for prediction reference.

Inverse quantization module 86 inverse quantizes, i.e., de-quantizes, the quantized transform coefficients provided in the bitstream and decoded by entropy decoding module 80. The inverse quantization process may include use of a quantization parameter calculated by video encoder 20 for each video block in the video slice to determine a degree of quantization and, likewise, a degree of inverse quantization that should be applied. Inverse transform module 88 applies an inverse transform, e.g., an inverse DCT, an inverse integer transform, or a conceptually similar inverse transform process, to the transform coefficients in order to produce residual blocks in the pixel domain.

After motion compensation module 82 generates the predictive block for the current video block based on the motion vectors and other syntax elements, video decoder 30 forms a decoded video block by summing the residual blocks from inverse transform module 88 with the corresponding blocks for prediction reference generated by motion compensation module 82. Summer 90 represents the component or components that perform this summation operation. If desired, loop filters (either in the coding loop or after the coding loop) may also be used to smooth pixel transitions, or otherwise improve the video quality. Filter module 91 is intended to represent one or more loop filters such as a deblocking filter, an adaptive loop filter (ALF), and a sample adaptive offset (SAO) filter. Although filter module 91 is illustrated in FIG. 3 as being an in loop filter, in other configurations, filter module 91 may be implemented as a post loop filter. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

In this manner, video decoder 30 of FIG. 3 represents an example of a video decoder configured to decoder parameter set IDs coded according to the techniques of this disclosure.

Figure 4:
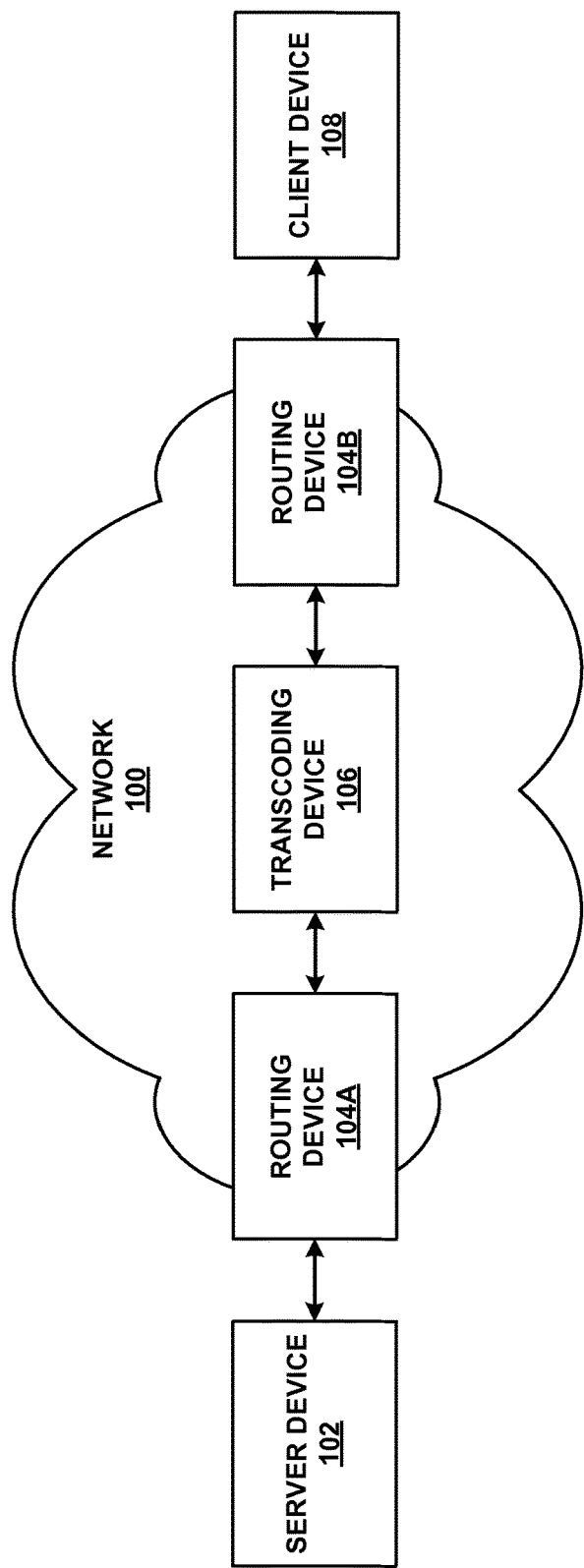
FIG. 4 is a block diagram illustrating an example set of devices that form part of a network for communication of video data.

FIG. 4 is a block diagram illustrating an example set of devices that form part of network 100. In this example, network 10 includes routing devices 104A, 104B (routing devices 104) and transcoding device 106. Routing devices 104 and transcoding device 106 are intended to represent a small number of devices that may form part of network 100. Other network devices, such as switches, hubs, gateways, firewalls, bridges, and other such devices may also be included within network 100. Moreover, additional network devices may be provided along a network path between server device 102 and client device 108. Server device 102 may correspond to source device 12 (FIG. 1), while client device 108 may correspond to destination device 14 (FIG. 1), in some examples.

In general, routing devices 104 implement one or more routing protocols to exchange network data through network 100. In some examples, routing devices 104 may be configured to perform proxy or cache operations. Therefore, in some examples, routing devices 104 may be referred to as proxy devices. In general, routing devices 104 execute routing protocols to discover routes through network 100. By executing such routing protocols, routing device 104B may discover a network route from itself to server device 102 via routing device 104A.

The techniques of this disclosure may be implemented by network devices such routing devices 104 and transcoding device 106, but also may be implemented by client device 108. In this manner, routing devices 104, transcoding device 106, and client device 108 represent examples of devices configured to perform the techniques of this disclosure. Moreover, the devices of FIG. 1, and encoder illustrated in FIG. 2 and the decoder illustrated in FIG. 3 are also exemplary devices that can be configured to perform the techniques of this disclosure.

For examples, server device 102 may include an encoder to encode a picture or pictures that are after a random access point or stream adaptation point, such as a temporal layer switching point, or other stream adaptation point. For example, this could be a switching point for adaptation of bit rate, frame rate (i.e., temporal layer switching point), or spatial resolution Similarly, client device 108 may decode a picture or pictures that are after a random access point or stream adaptation point, such as a temporal layer switching point. Again, this could be a switching point for adaptation of bit rate, frame rate (i.e., temporal layer switching point), or spatial resolution. One or more of these pictures may be leading pictures. The leading pictures cannot be correctly decoded at client device 108 when random access from the BLA picture occurs.

In an example, to prevent error propagation from reference pictures that may not be available depending on where the decoding starts, client device 108 may not apply pictures stored in the decoded picture buffer (DPB) that precedes the BLA picture either in decoding order or output order (which includes the leading pictures) as reference pictures.

In various examples, client device 108 may mark all reference pictures in the DPB as unused for reference before decoding the BLA picture. For example, client device 108 may mark reference pictures in the decode picture buffer (DPB) as unused for reference.

In another example, server device 102, client device 108, or both, may include a syntax element or flag in a slice header and encode the flag into a bitstream, e.g., a no_output_of_prior_pics_flag, so that none of the prior pictures in the DPB processed by the video decoder 30 to decode leading pictures or output from the DPB, e.g., for presentation on a monitor. In some examples, this flag may be early in the slice header before entropy decoding so that it can be more easily decoded and the information is available earlier in the coding process. In an example, one of these network element devices may convert a CRA to a BLA when, for example, splicing or channel switching or stream adaptation, such as temporal layer switching, is needed. Having the flag may accessible without entropy coding allows for network elements without the ability to entropy decode to have access to the flag.

The plurality of NAL unit types includes one or more of (1) a coded slice of a broken link access (BLA) picture, wherein the BLA picture is a BLA picture with associated leading pictures in a bitstream, (2) a coded slice of a BLA picture, wherein the BLA picture is a BLA picture with associated decodable leading pictures in the bitstream, and (3) a coded slice of a BLA picture, wherein the BLA picture is a BLA picture with no associated leading pictures in the bitstream. In an example, the leading picture comprises a picture that precedes a random access picture (RAP) in a display order but follows the random access picture in decoding order.

In various examples, routing devices 104A, 104B, and transcoding device 106 that make up network 100 may also perform some processing on picture or pictures that are after a random access point or stream adaptation point, such as a temporal layer switching point. For example, this could be a switching point for adaptation of bit rate, frame rate (i.e., temporal layer switching point), or spatial resolution. As discussed above, one or more of these pictures may be leading pictures that cannot be correctly decoded.

In an example, one or more of routing devices 104A, 104B, and transcoding device 106 may not use any picture that precedes the CRA picture either in decoding order or output order (which includes the leading pictures) as reference pictures. In another example, one or more of routing devices 104A, 104B, and transcoding device 106 may mark all reference pictures in the DPB as unused for reference before decoding the BLA picture. For example, one or more of routing devices 104A, 104B, and transcoding device 106 may mark reference pictures in the decoded picture buffer (DPB) as unused for reference. In another example, one or more of routing devices 104A, 104B, and transcoding device 106 or a streaming server may use a flag, e.g., a no_output_of_prior_pics_flag so that none of the prior pictures in the DPB are output. Additionally, routing devices 104A, 104B, and transcoding device 106 may process NAL unit types assigned to indicate when BLA pictures have and do not have leading pictures.

Figure 5:
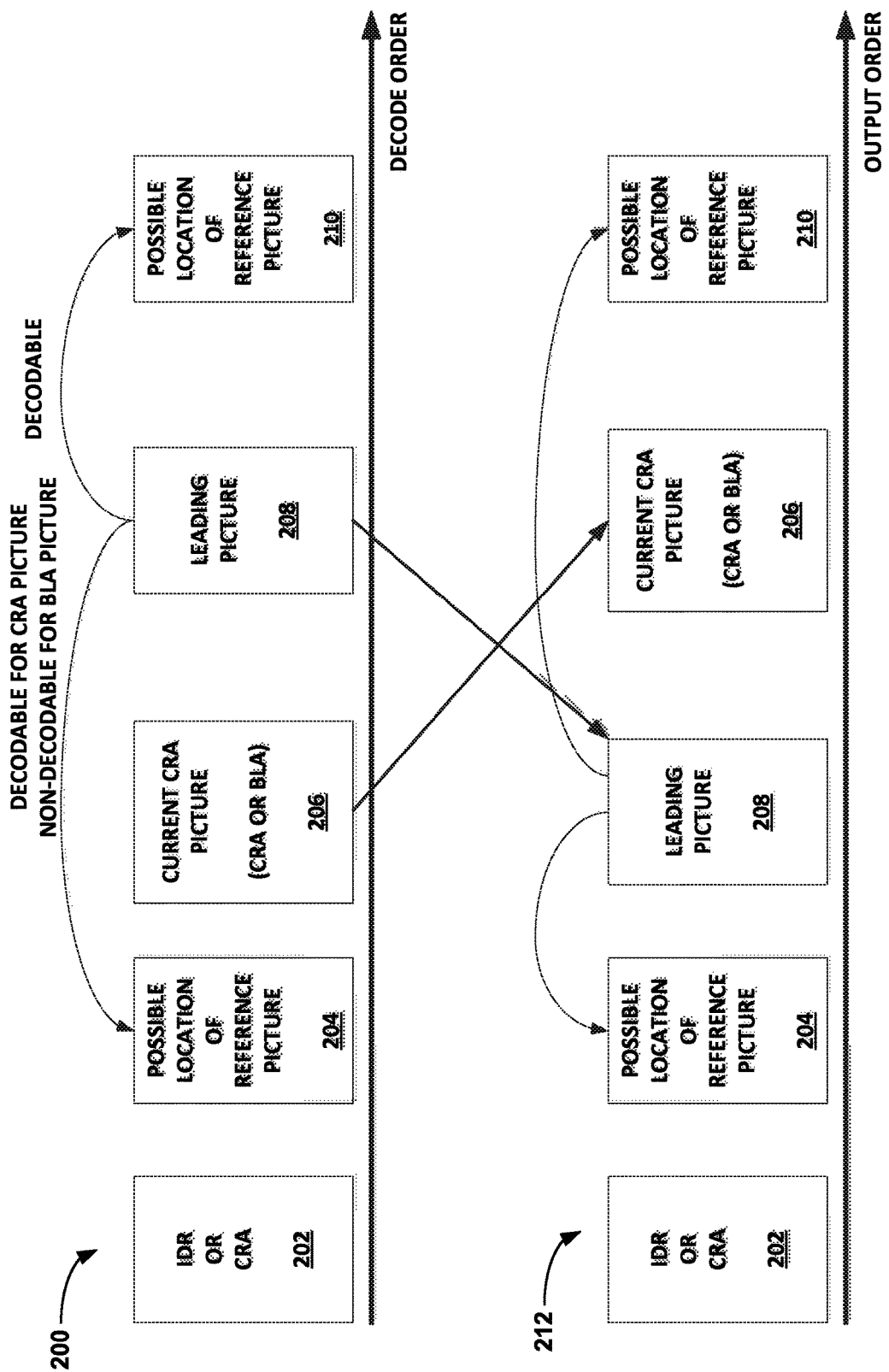
FIG. 5 is a diagram illustrating an example video sequence including a RAP picture in accordance with the techniques described in this disclosure.

FIG. 5 is a diagram illustrating an example in accordance with the techniques described in this disclosure. FIG. 5 illustrates examples of cases when leading pictures are decodable and non-decodable. The decodability of leading pictures may be based on location of the predictive block. Additionally, the decodability of leading pictures may be based on whether the current CRA picture is a CRA picture that is not a BLA picture or the current CRA picture is a CRA picture that is also a BLA picture. (BLA pictures are a subset of the CRA pictures.)

Portion 200 of FIG. 5 illustrates a series of pictures in decode order. Initially, video decoder 30 (FIGS. 1 and 3) or client device 108 (FIG. 4) for example, may decode a RAP picture at location 202 as a first picture in a video sequence. Video decoder 30 or client device 108 may then decode a picture or portion of a picture that may act as a reference picture at location 204. As illustrated in FIG. 5, location 204 is a possible location of the reference picture in decode order. If the reference picture is located at location 204 and picture at location 206 is a CRA picture that is not a BLA picture, then the leading picture at location 208 will be decodable. Conversely, if the reference picture is located at location 204 and the picture at location 206 is a CRA picture that is also a BLA picture, then the leading picture at location 208 will not be decodable. (BLA pictures are a subset of the CRA pictures.)

If the RAP picture at location 202 is the RAP picture, where decoding starts and the current CRA picture at location 206 is not a BLA picture then, as described above, the leading picture at location 208 is decodable. Conversely, if current CRA picture at location 206 is the RAP, then the current CRA picture at location 206 is also a BLA picture and the leading picture at location 208 is not decodable. This is because the predictive block at location 204 is not available for a BLA picture that is a current CRA picture at location 206. Accordingly, the predictive block at location 204 may be (1) marked as unused for reference and (2) the no_output_of_prior_pics_flag may indicate that the prior pictures, up to and including the leading picture at location 208 should not be output.

As illustrated in FIG. 5, location 210 is another possible location of the reference picture in decode order. If the reference picture is located at location 210 then leading picture at location 208 will be decodable.

Portion 212 of FIG. 5 illustrates a series of pictures in output order. Initially, video decoder 30 (FIGS. 1 and 3) or client device 108 (FIG. 4) a RAP picture 202. Video decoder 30 or client device 108 may then decode a picture or portion of a picture that may act as a predictive block at location 204. As illustrated in FIG. 5, location 204 is a possible location of the predictive block in output order.

In output order, leading picture 208 may be output before current CRA picture at location 206, as illustrated in FIG. 5. As illustrated in FIG. 5, location 210 is another possible location of the predictive block in output order.

Figure 6:
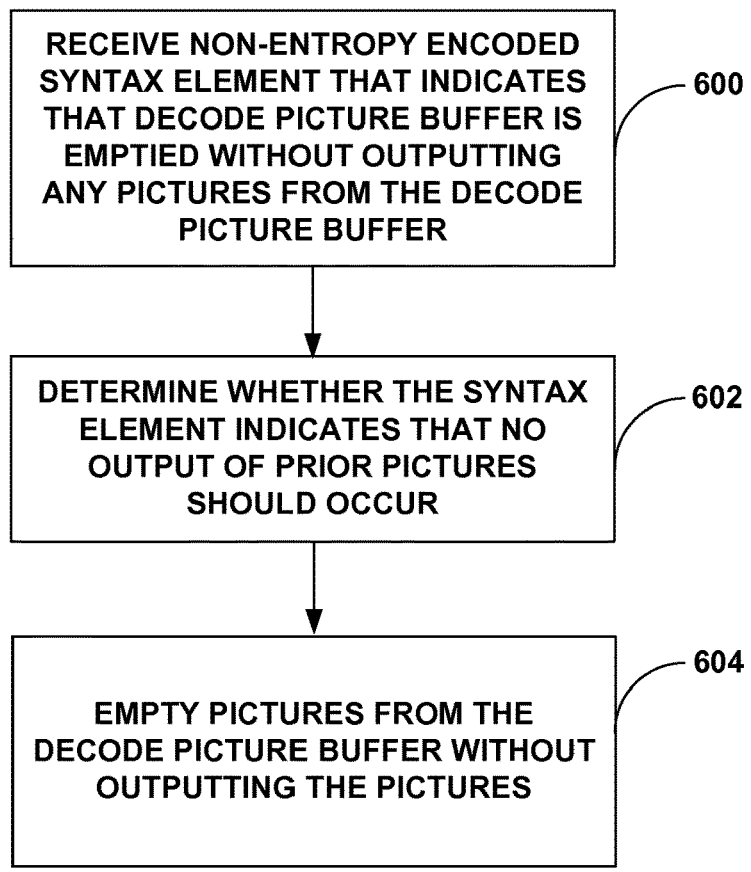
FIG. 6 is a flowchart illustrating an example method for coding RAP pictures in accordance with one or more examples described in this disclosure.

FIG. 6 is a flowchart illustrating an example method for coding RAP pictures in accordance with one or more examples described in this disclosure. As illustrated in FIG. 6, in some examples, a video coder, e.g., video encoder 20 or video decoder 30 may code a BLA picture for a random access point or stream adaptation point, such as a temporal layer switching point in a video sequence. For example, this could be a switching point for adaptation of bit rate, frame rate or spatial resolution. The BLA picture may include one or more leading pictures. The leading pictures cannot be correctly decoded (e.g., by decoder 30, a MANE, or other decoding device) when random access from BLA picture occurs.

In an example, to prevent error propagation from reference pictures that may not be available depending on where the decoding starts, video coder may not use any picture that precedes the BLA picture either in decoding order or output order (which includes the leading pictures) as reference pictures.

For example, video decoder 30 may receive and decode a syntax element that indicates that a picture storage buffer is emptied without outputting any pictures from the picture storage buffer (600). The syntax element may be included in the encoded video bitstream by encoder 20 or an intermediate network element. Video decoder 30 may determine whether the syntax element indicates that a no output of prior pictures should occur, for example, video decoder 30 may check the syntax element (602) to determine whether it is set, i.e., equal to 1. When the video decoder 30 receives a syntax element that is set, the video decoder 30 may cause pictures prior to a current picture in decoding order and residing in the picture storage buffer at the time of the decoding of the current picture to be emptied from the picture storage buffer without being output (604).

In some examples, the syntax element may be one of a plurality of syntax elements. Additionally, the plurality of syntax elements may include entropy coded slice header syntax elements and non-entropy coded slice header syntax elements. In an example, the syntax element may indicate that a picture storage buffer is empty without outputting any pictures from the decoded picture buffer is included in the slice header before any entropy coded slice header syntax element. In another example, the syntax element may indicate that data in the picture storage buffer should be ignored and/or overwritten without outputting any pictures from the picture storage buffer is included in the slice header before any entropy coded slice header syntax element. In some examples, the syntax element may be a no_output_of_prior_pics_flag and the no_output_of_prior_pics_flag may be included in the slice header immediately after a first_slice_in_pic_flag. The first_slice_in_pic_flag may be a flag that indicates whether a slice is the first slice, in decoding order, of a picture.

Figure 7:
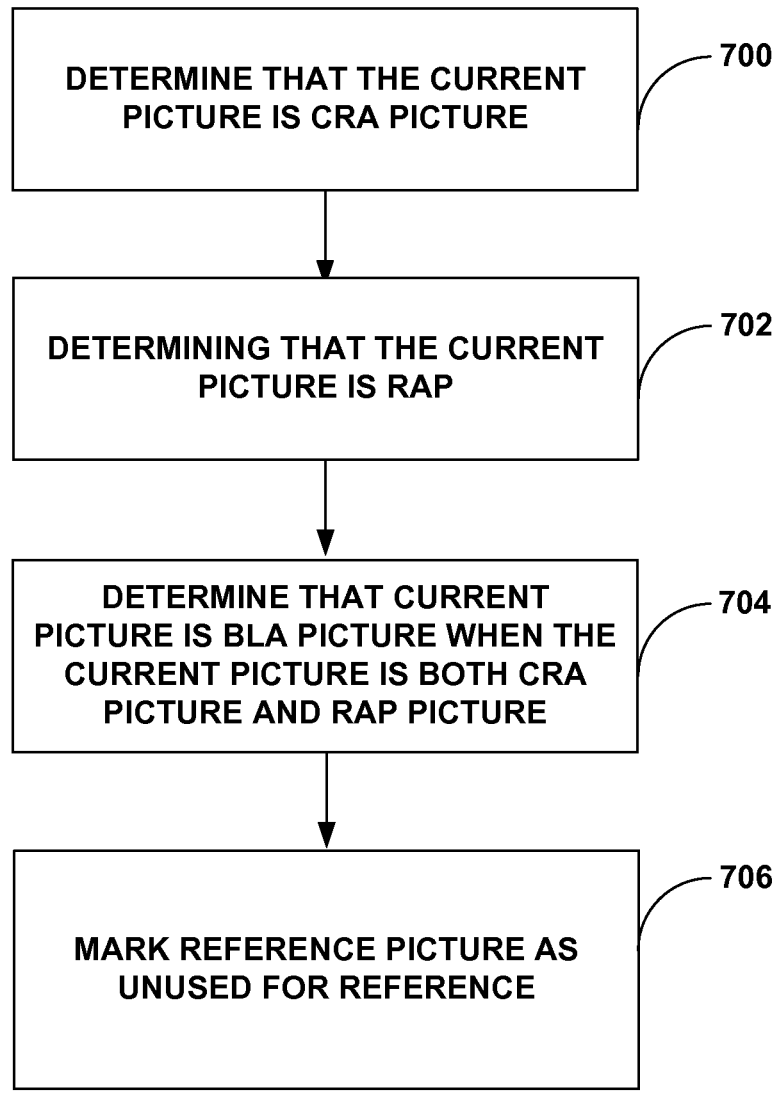
FIG. 7 is a flowchart illustrating an example method for coding RAP pictures in accordance with one or more examples described in this disclosure.

FIG. 7 is a flowchart illustrating an example method in accordance with one or more examples described in this disclosure. In the illustrated example, a video coder may determine that the current picture is a CRA picture (700). The video coder may also determine that the current picture is a RAP picture (702). The video coder may determine that the current picture is a BLA picture (700). In other examples, a video coder may use NAL unit type to determine if that the current picture is a BLA picture.

In various examples, the video coder may mark all reference pictures in the DPB as unused for reference before decoding the BLA picture. For example, video decoder 30 may mark reference pictures in the reference picture memory 92, sometimes referred to as the decoded picture buffer (DPB), as unused for reference. Accordingly, the pictures will not be used for inter-coding, which will avoid possible errors, and in some examples may address issues with spatial adaptation. Additionally, generally these pictures will not be output to, for example, a monitor or screen, where they may be viewed.

Video decoder 30 may determine that a current picture is a BLA picture and marking a reference picture in a picture storage buffer as unused for reference prior to decoding the BLA picture. In an example, marking of the reference picture in the picture storage buffer may occur when the BLA picture comprises a non-decodable BLA picture, which may be determined in some examples, based on NAL unit type. In some examples, one or more of (1) marking pictures in a DPB as unused for reference, (2) using a syntax element such as a no_output_of_prior_pics_flag, and (3) using NAL unit types that indicate BLA pictures may be used, independently or in any combination.

Figure 8:
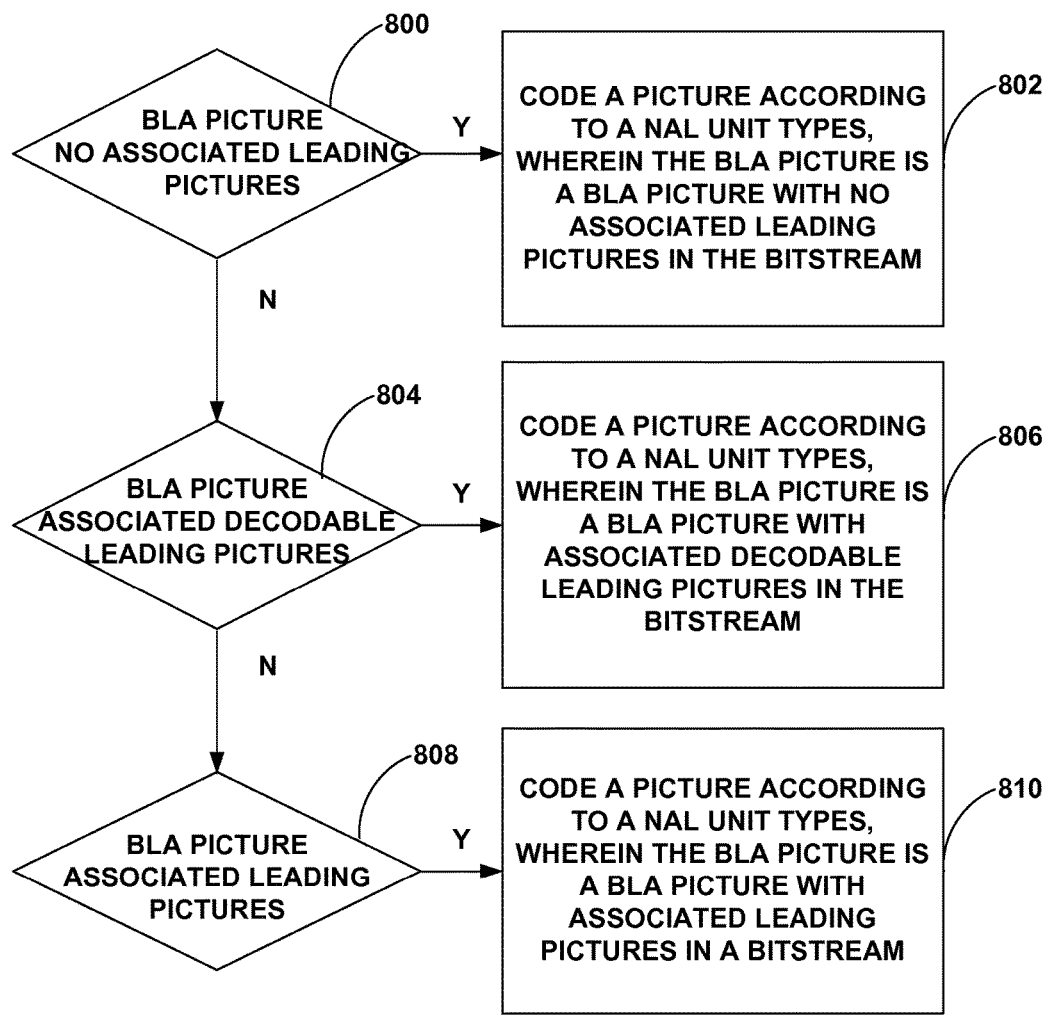
FIG. 8 is a flowchart illustrating an example method for coding RAP pictures in accordance with one or more examples described in this disclosure.

FIG. 8 is a flowchart illustrating an example method in accordance with one or more examples described in this disclosure. A video coder may process NAL unit types assigned to indicate when BLA pictures have and do not have leading pictures. Video coder may be configured to include NAL unit types assigned to indicate when BLA pictures have and do not have leading pictures. For example, in one standard, NAL unit types 16, BLA_W_LP (BLA with leading picture); 17, BLA_W_DLP (BLA with decodable leading picture); and 18, BLA_N_LP (BLA no leading picture) are included.

In one example, the video coder may code pictures according to one of a plurality of different network abstraction layer (NAL) unit types including one or more of the following. For example, the video coder may determine that a BLA picture has no associated leading pictures (800) and code a coded slice of the BLA picture or the entire BLA picture using a NAL unit type that indicates that the BLA picture is a BLA picture with no associated leading pictures in a bitstream (802). The video coder may determine that a BLA picture has associated decodable leading pictures (804) and code a coded slice or the entire BLA picture using a NAL unit type that indicates that the BLA picture is a BLA picture with associated decodable leading pictures in the bitstream (806). The video coder determine that a BLA picture has associated leading pictures (808) and may code a coded slice of the BLA picture or the entire BLA picture using a NAL unit type that indicates that the BLA picture is a BLA picture with associated leading pictures in the bitstream (810). In an example, if video decoder 30 detects a BLA NAL unit type, then video decoder 30 may, for example, mark pictures in the DPB as unused for reference.

In some examples, one or more of (1) marking pictures in a DPB as unused for reference, (2) using a syntax element such as a no_output_of_prior_pics_flag, and (3) using NAL unit types that indicate BLA pictures may be used, independently or in any combination. For example, in some cases all three of these may be used. In other examples, the example NAL unit types might be used in conjunction with marking pictures in the DPB as unused for reference. In another example, the no output of prior pictures syntax element and marking the pictures as unused for reference might be used. In another example, the no output of prior pictures syntax elements and NAL unit types might be used.

As used herein, BLC refers to Broken-Link Clean random access, BLCL refers to a BLC picture with associated leading pictures in the bitstream and BLCNL refers to a BLC picture with no associated leading pictures in the bitstream. As discussed herein, BLC pictures are generally the same as BLA pictures. CRA refers to Clean Random Access, CRAL refers to a CRA picture with associated leading pictures in the bitstream, and CRANL refers to a CRA picture with no associated leading pictures in the bitstream. IDR refers to Instantaneous Decoding Refresh, LPR refers to leading picture associated with a random access point picture, NSP refers to Nothing Special Plain, RAP refers to Random Access Point, and RPS refers to Reference Picture Set. As used herein TLA refers to Temporal Layer Access, TLAL refers to TLA picture that is also an LRP picture, TLANL refers to TLA picture that is not an LRP picture.

BLA access unit refers to an access unit in which the coded picture is a BLA picture. A BLC picture is a RAP picture in which the slice header of the coded slices includes RPS syntax while the RPS is derived as empty without using the RPS syntax. A BLCL access unit is an access unit in which the coded picture is a BLCL picture. BLCL pictures are BLA pictures for which the associated LPR pictures are present in the bitstream. In some examples, a BLCL access unit may be equivalent to a combination of BLA_W_DLP and BLA_W_LP. A BLCNL access unit is an access unit in which the coded picture is a BLCNL picture. In some examples, a BLCNL access unit may be equivalent to BLA_N_LP. BLCNL pictures are BLA pictures for which the associated LPR pictures are not present in the bitstream.

In an example, a CRA access unit is an access unit in which the coded picture is a CRA picture. CRA pictures are RAP picture in which the slice header of the coded slices includes RPS syntax and the RPS syntax is used for derivation of the RPS. A CRAL access unit is an access unit in which the coded picture is a CRAL picture. CRAL pictures are CRA picture for which the associated LPR pictures are present in the bitstream. A CRANL access unit is an access unit in which the coded picture is a CRANL picture. CRANL pictures are CRA pictures for which the associated LPR pictures are not present in the bitstream.

In an example, an IDR access unit is an access unit in which the coded picture is an IDR picture. IDR pictures are RAP pictures in which the slice header of the coded slices does not include RPS syntax and the RPS is derived as empty.

In an example, if all preceding access units in decoding order are not present, provided that each parameter set referred to by the coded picture and all subsequent coded pictures in decoding order is present before its activation, an IDR picture and all subsequent coded pictures in decoding order can be correctly decoded. Alternatively, in another example, IDR pictures may be as defined in HEVC with the addition of the preceding.

In other examples, IDR picture may be defined as follows plus the preceding note, an IDR picture may be a coded picture containing only I slices. Additionally, for an example IDR picture all coded pictures that follow the IDR picture in decoding order do not use inter prediction from any picture that precedes the IDR picture in decoding order. In an example, any picture that precedes the IDR picture in decoding order also precedes the IDR picture in output order.

A leading picture is a coded picture that is not a RAP picture and that follows some other particular picture in decoding order and precedes the particular picture in output order. An LPR picture is a leading picture that is associated with a RAP picture or a leading picture of a RAP picture.

Picture order count may be a variable that is associated with each coded picture and has a value that is increasing with increasing picture position in output order relative to the previous RAP picture in decoding order.

In an example, a RAP access unit is an access unit in which the coded picture is a RAP picture. A RAP picture may be a coded picture containing only I slices. For a RAP picture, all coded pictures that follow the RAP picture both in decoding order and output order do not use inter prediction from any picture that precedes the RAP picture either in decoding order or output order. The output of any picture that precedes the RAP picture in decoding order shall precede the output of the RAP picture. If all preceding access units in decoding order are not present, provided that each parameter set referred to by the coded picture and all subsequent coded pictures in decoding order is present before its activation, a RAP picture and all subsequent coded pictures in both decoding order and output order can be correctly decoded.

Alternatively, RAP picture may be defined consistent with the preceding discuss and as follows. A RAP picture may be a coded picture containing only I slices and for which all coded pictures that follow the RAP picture both in decoding order and output order do not use inter prediction from any picture that precedes the RAP picture either in decoding order or output order. Any picture that precedes the RAP picture in decoding order also precedes the RAP picture in output order.

A TLA access unit is an access unit in which the coded picture is a TLA picture. A TLA picture is a coded picture for which the TLA picture and all coded pictures with temporal_id greater than or equal to the temporal_id of the TLA picture. A TLA picture that follows the TLA picture in decoding order shall not use inter prediction from any picture with temporal_id greater than or equal to the temporal_id of a TLA picture that precedes the TLA picture in decoding order. A TLAL access unit is an access unit in which the coded picture is a TLA picture.

In some examples, the following distinct VCL NAL unit types may be defined. As a first example, a NAL unit type may be provided for a coded slice of an IDR picture (e.g., nal_unit_type=5). For this NAL unit type, the IDR picture concept in HEVC WD6 applies. A unique feature of this VCL NAL unit type compared to other types of VCL NAL units is that there is no reference picture set (RPS) syntax included in the slice header.

Some examples include a coded slice of a BLCNL picture (a BLC picture with no associated leading pictures in the bitstream, e.g., nal_unit_type=2). Compared to a coded slice of an IDR picture, a coded slice of a BLCNL picture includes RPS syntax in the slice header, but the RPS syntax is not used for RPS derivation, but rather all RPS subsets are derived to be empty.

Some examples include a coded slice of a BLCL picture (a BLC picture with associated leading pictures in the bitstream, e.g., nal_unit_type=3) Compared to a BLCNL picture, there are leading pictures associated with a BLCL picture in the bitstream.

Some examples include a coded slice of a CRANL picture (a CRA with no associated leading pictures in the bitstream, e.g., nal_unit_type=15) Compared to a coded slice of a BLCNL picture, a coded slice of a CRANL picture includes RPS syntax in the slice header, and the RPS syntax is used for RPS derivation.

Some examples include a coded slice of a CRAL picture (a CRA picture with associated leading pictures in the bitstream, e.g., nal_unit_type=4) Compared to a CRANL picture, there are leading pictures associated with a CRAL picture in the bitstream.

Some examples include a coded slice of a TLANL picture (a TLA picture that is not an LFR picture, e.g., nal_unit_type=16). Some examples include a coded slice of a TLAL picture (a TLA picture that is also an LPR picture, e.g., nal_unit_type=17). Some examples include a coded slice of a NSP picture (a nothing-special plain picture—not any of the above, nal_unit_type=1)

Before decoding the slice data of each BLC picture (BLCL or BLCNL) picture, all reference pictures in the decoded picture buffer (DPB) must be marked as "unused for reference" by decoder 30, as described above. Only with this in place, the current decoding process as currently specified in HEVC WD 6 for leading pictures of a CRA picture that starts the bitstream can be directly applied by decoder 30 for leading pictures of a BLA picture, regardless of whether the BLA picture changes the spatial resolution.

Without the above, if a BLA picture does not change the spatial resolution, the current decoding process as currently specified in HEVC WD 6 for leading pictures of a CRA picture that starts the bitstream can be directly applied by decoder 30 for leading pictures of the BLA picture. However if a BLA picture changes the spatial resolution, then the current decoding process as currently specified in HEVC WD 6 for leading pictures of a CRA picture that starts the bitstream cannot be directly applied for leading pictures of the BLA picture, as the situation may appear that the spatial resolution is different for a current picture and a reference picture for the current picture.

One way to ensure that all reference pictures in the DPB are to be marked as "unused for reference" before decoding the slice data of each BLA picture is to derive the RPS of each BLA picture to be empty, regardless of whether the RPS signaling in the slice header indicates non-empty RPS. For example, even if there is an RPS, the video decoder 30 may override this and derives or treats the RPS as empty if the picture is a BLA picture.

Actually, if the RPS signaling in the slice header does indicate empty RPS for a BLA picture or a CRA (CRAL or CRANL) picture, then the picture should have been coded as an IDR picture.

In some examples, a RAP picture may be defined as a coded picture containing only I slices. For a RAP picture, all coded pictures that follow the RAP picture both in decoding order and output order do not use inter prediction from any picture that precedes the RAP picture either in decoding order or output order. Additionally, the output of any picture that precedes the RAP picture in decoding order may precede the output of the RAP picture.

To ensure that the output of any picture that precedes the RAP picture in decoding order shall precede the output of the RAP picture, one way is for a video encoder 20 to set the no_output_of_prior_pics_flag equal to 1 in a coded bitstream transmitted to, for example, a video decoder 30, as discussed above. In another example, a video decoder 30 may infer no_output_of_prior_pics_flag to be equal to 1 (regardless of its value) for a BLA picture. This way, splicing operations at a BLA picture wherein in the spliced bitstream the POC value of a picture earlier than the BLA picture is greater than the POC value of the BLA picture is allowed. In particular, the POC value of the BLA picture is derived as equal to its POC LSB (by assuming POC MSB equal to 0), the above can easily happen. Another way to ensure this is to make sure that the output times of pictures that precede the BLA picture in decoding order are earlier than that of the BLA picture.

Some examples allow the video encoder 20 and/or a bitstream splicer to determine which of the ways described herein to use. Accordingly, video encoder 20, for example, may include a no_output_of_prior_pics_flag in the slice header of BLA pictures in some examples. In other examples, video encoder 20 may include NAL unit types that indicate if pictures stored in a buffer at video decoder 30 may be used for reference. Accordingly, video decoder 30 may mark pictures as unused for reference, for example, when the use of such pictures in decoding will result in incorrectly decoding a picture.

To enable simple rewriting of a CRA to a BLA picture by a network element, in addition to putting the no_output_of_prior_pics_flag in the slice header of a CRA picture, it may also be included as early as possible in the slice header. This may be before any entropy coded slice header parameters, e.g., immediately after first_slice_in_pic_flag in some examples, as discussed above.

In an example, two back-to-back BLA pictures have the same POC LSB, and it is only possible to differentiate them by random access_pic_id (or renamed to rap_pic_id). Thus, it might be preferable to use fixed-length coding for rap_pic_id, and also put included as early as possible in the slice header, preferably not after any entropy coded sliced header parameters, e.g., immediately after first_slice_in_pic_flag and no_output_of_prior_pics_flag, e.g., for both CRA pictures and BLA pictures. Other slice header syntax elements that may be used for picture boundary detection, e.g., pic_parameter_set_id, and POC LSB (i.e., pic_order_cnt_lsb) may be similar.

All parameter sets of a particular type (e.g., SPS) or all types may be present in the beginning of the bitstream, i.e., included in the first access unit in the bitstream. If so, it is convenient to fetch all the parameter sets of a particular type and send them out-of-band. For example, a coder may include in a Session Description Protocol (SDP) parameter which is used during session negotiation. Therefore, it may be beneficial for an encoder to include an indication in the bitstream that all parameter sets of a particular type or all types are present in the beginning of the bitstream. The indication may be included in an SEI message, an access unit delimiter, or a parameter set. For example, a distinct NAL unit type may be used for SPS, picture parameter set (PPS), or adaptation parameter set (APS) to indicate that all SPSs (or PPSs or APSs) are present in the beginning of the bitstream.

The syntax element slice_type may be conditionally present in the slice header, based on whether the NAL unit type indicates that the picture containing the slice is an IDR picture, a CRA picture, or a BLA picture. For example, if The NAL unit type indicates that the picture containing the slice is an IDR picture, a CRA picture, or a BLA picture, slice_type is not present in the slice header. Otherwise, the encoder inserts the slice_type in the slice header. When not present, the value of slice_type indicates that the slice is an I slice.

Figure 9:
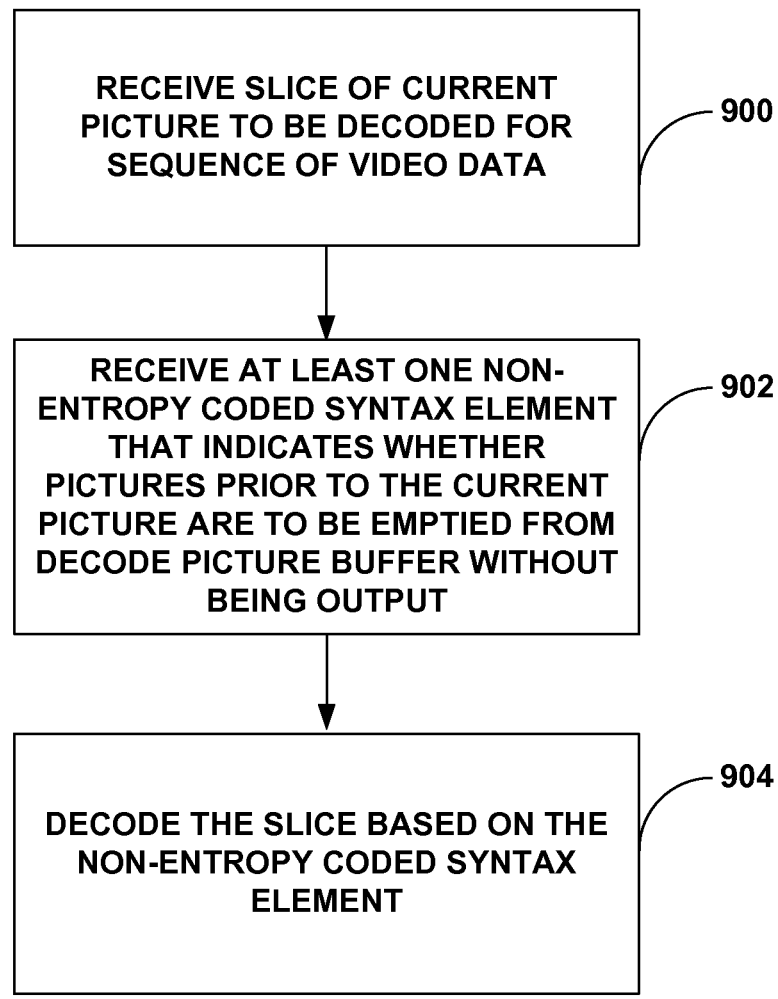
FIG. 9 is a flowchart illustrating an example method for decoding a slice in accordance with one or more examples described in this disclosure.

FIG. 9 is a flowchart illustrating an example method for decoding a slice in accordance with one or more examples described in this disclosure. In one example, video decoder 30 may decode video data, including receiving a slice of a current picture to be decoded for a sequence of video data (900). Video decoder 30 may receive, in a slice header of the slice, at least one entropy coded syntax element and at least one non-entropy coded syntax element. The non-entropy coded syntax element may be before the entropy coded syntax element in the slice header. Additionally, the non-entropy coded syntax element may indicate whether pictures prior to the current picture in decoding order are to be emptied from a picture storage buffer without being output (902). In one example, the syntax element may be a no_output_of_prior_pics_flag. The no_output_of_prior_pics_flag may be set to "1," e.g., to indicate when pictures prior to the current picture in decoding order are to be emptied from a picture storage buffer without being output. Video decoder 30 may decode the slice based on the non-entropy coded syntax element (904).

Figure 10:
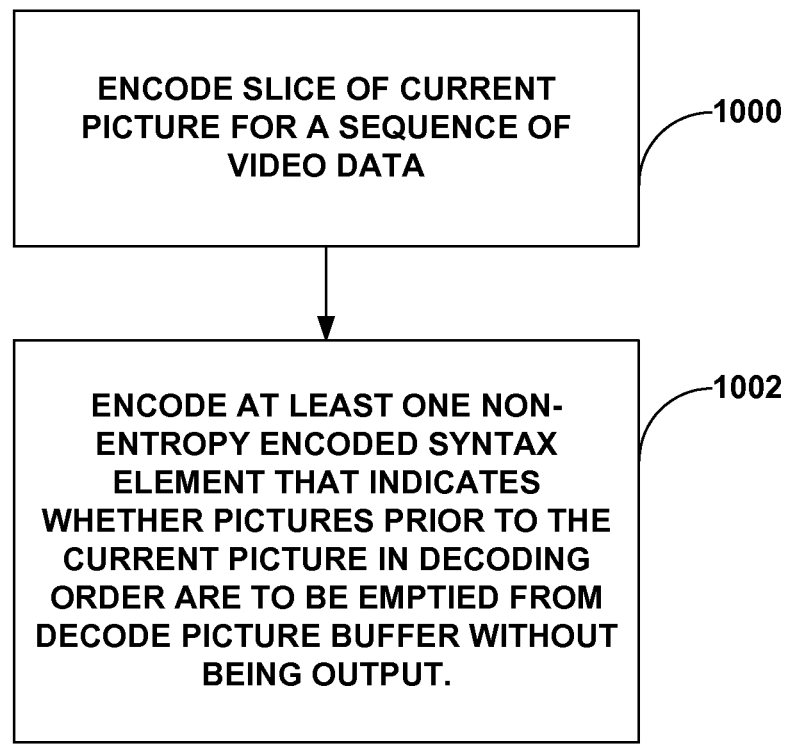
FIG. 10 is a flowchart illustrating an example method for encoding a slice in accordance with one or more examples described in this disclosure.

FIG. 10 is a flowchart illustrating an example method for encoding a slice in accordance with one or more examples described in this disclosure. Encoder 20 may encode video data. Video encoder 20 may encode a slice of a current picture for a sequence of video data (1000).

Video encoder 20 encodes, in a slice header of the slice, at least one entropy encoded syntax element and at least one non-entropy coded syntax element, wherein the non-entropy encoded syntax element is before the entropy encoded syntax element in the slice header and indicates whether pictures prior to the current picture in decoding order are to be emptied from a picture storage buffer without being output (1002). In one example, the syntax element may be a no_output_of_prior_pics_flag. The no_output_of_prior_pics_flag may be set to "1," e.g., to indicate when pictures prior to the current picture in decoding order are to be emptied from a picture storage buffer without being output.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

In still other examples, this disclosure contemplates a computer readable medium comprising a data structure stored thereon, wherein the data structure includes an encoded bitstream consistent with this disclosure. In particular, the data structures may include the NAL unit designs described herein.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining, based on a Network Abstraction Layer (NAL) unit type of a NAL unit for a coded slice of a current picture, that the current picture is a broken-link access (BLA) picture, wherein the BLA picture is associated with one or more leading pictures, including a non-decodable leading picture, wherein the non-decodable leading picture references a reference picture that is not the BLA picture and is not any picture that follows the BLA picture in decoding order, and wherein the BLA picture includes syntax elements that specify a non-empty reference picture set (RPS);
    based on determining that the current picture is a BLA picture, marking all reference pictures in a picture storage buffer as unused for reference prior to decoding the BLA picture; and
    decoding the leading pictures of the BLA picture by applying a particular decoding process, wherein the particular decoding process is used to decode leading pictures of a clean random access (CRA) picture at the start of a bitstream, and wherein the particular decoding process allows CRA pictures that start bitstreams to be followed in decoding order by leading pictures that cannot be decoded due to missing prior reference pictures.

2. The method of claim 1, wherein the picture storage buffer includes a decoded picture buffer (DPB).

3. The method of claim 1, further comprising decoding the BLA picture in a decoder.

4. The method of claim 1, further comprising decoding the BLA picture without using the reference pictures marked as unused for reference.

5. The method of claim 1, further comprising:
    receiving, in a slice header of the coded slice of the current picture, at least one entropy coded syntax element and at least one non-entropy coded syntax element, wherein the non-entropy coded syntax element is before the entropy coded syntax element in the slice header and the non-entropy coded syntax element indicates whether pictures prior to the current picture in decoding order are to be emptied from a decoded picture buffer without being output; and
    decoding the slice based on the non-entropy coded syntax element.

6. The method of claim 5, wherein the non-entropy coded syntax element comprises a no_output_of_prior_pics_flag.

7. A device for decoding video data, the device comprising:
    a picture storage buffer; and
    one or more processors configured to:
        determine, based on a Network Abstraction Layer (NAL) unit type of a NAL unit for a coded slice of a current picture, that the current picture is a broken-link access (BLA) picture, wherein the BLA picture is associated with one or more leading pictures, including a non-decodable leading picture, wherein the non-decodable leading picture references a reference picture that is not the BLA picture and is not any picture that follows the BLA picture in decoding order, and wherein the BLA picture includes syntax elements that specify a non-empty reference picture set (RPS);
        based on determining that the current picture is a BLA picture, mark all reference pictures in the picture storage buffer as unused for reference prior to decoding the BLA picture; and
        decode the leading pictures of the BLA picture by applying a particular decoding process, wherein the particular decoding process is used to decode leading pictures of a clean random access (CRA) picture at the start of a bitstream, and wherein the particular decoding process allows CRA pictures that start bitstreams to be followed in decoding order by leading pictures that cannot be decoded due to missing prior reference pictures.

8. The device of claim 7, wherein the picture storage buffer includes a decoded picture buffer (DPB).

9. The device of claim 8, wherein the device comprises a decoder.

10. The device of claim 7, wherein the device comprises a splicer.

11. The device of claim 7, wherein the one or more processors are further configured to decode the BLA picture without using the reference pictures marked as unused for reference.

12. The device of claim 7, wherein the one or more processors are further configured to:
receive, in a slice header of the coded slice of the current picture, at least one entropy coded syntax element and at least one non-entropy coded syntax element, wherein the non-entropy coded syntax element is before the entropy coded syntax element in the slice header and the non-entropy coded syntax element indicates whether pictures prior to the current picture in decoding order are to be emptied from a decoded picture buffer without being output; and
decode the slice based on the non-entropy coded syntax element.

13. The device of claim 12, wherein the non-entropy coded syntax element comprises a no_output_of_prior_pics_flag.

14. A device for decoding video data, the device comprising:
means for determining, based on a Network Abstraction Layer (NAL) unit type of a NAL unit for a coded slice of a current picture, that the current picture is a broken-link access (BLA) picture, wherein the BLA picture is associated with one or more leading pictures, including a non-decodable leading picture, wherein the non-decodable leading picture references a reference picture that is not the BLA picture and is not any picture that follows the BLA picture in decoding order, and wherein the BLA picture includes syntax elements that specify a non-empty reference picture set (RPS);
means for marking, based on determining that the current picture is a BLA picture, all reference pictures in a picture storage buffer as unused for reference prior to decoding the BLA picture; and
means for decoding the leading pictures of the BLA picture by applying a particular decoding process, wherein the particular decoding process is used to decode leading pictures of a clean random access (CRA) picture at the start of a bitstream, and wherein the particular decoding process allows CRA pictures that start bitstreams to be followed in decoding order by leading pictures that cannot be decoded due to missing prior reference pictures.

15. The device of claim 14, wherein the picture storage buffer comprises a decoded picture buffer (DPB).

16. A non-transitory, tangible computer storage medium having stored thereon instructions that, when executed, cause one or more processors of a device to:
determine, based on a Network Abstraction Layer (NAL) unit type of a NAL unit for a coded slice of a current picture, that the current picture is a broken-link access (BLA) picture, wherein the BLA picture is associated with one or more leading pictures, including a non-decodable leading picture, wherein the non-decodable leading picture references a reference picture that is not the BLA picture and is not any picture that follows the BLA picture in decoding order, and wherein the BLA picture includes syntax elements that specify a non-empty reference picture set (RPS);
based on determining that the current picture is a BLA picture, mark all reference pictures in a picture storage buffer as unused for reference prior to decoding the BLA picture; and
decode the leading pictures of the BLA picture by applying a particular decoding process, wherein the particular decoding process is used to decode leading pictures of a clean random access (CRA) picture at the start of a bitstream, and wherein the particular decoding process allows CRA pictures that start bitstreams to be followed in decoding order by leading pictures that cannot be decoded due to missing prior reference pictures.

17. The storage medium of claim 16, further comprising instructions that cause the one or more processors to allocate a portion of a memory to a picture storage buffer that forms part of a decoded picture buffer (DPB).

18. The storage medium of claim 16, further comprising instructions that cause the one or more processors to cause a decoder to decode the BLA picture.

* * * * *